[54] METHOD OF AND APPARATUS FOR RECORDING HALFTONE IMAGES AND HALFTONE IMAGES PRODUCED THEREBY

[75] Inventors: Osamu Kitagawa; Takashi Sakamoto, both of Kyoto, Japan

[73] Assignee: Dainippon Screen Mfg. Co., Ltd., Kyoto, Japan

[21] Appl. No.: 426,627

[22] Filed: Oct. 25, 1989

[30] Foreign Application Priority Data

Nov. 24, 1988 [JP] Japan ................................ 63-296569
Aug. 8, 1989 [JP] Japan ................................ 1-205127

[51] Int. Cl.$^5$ ............................................. H04N 1/46
[52] U.S. Cl. ...................................... 358/75; 358/298; 358/454; 358/456; 358/459; 358/80
[58] Field of Search .................... 358/75, 76, 78, 79, 358/80, 298, 454, 455, 456, 457, 458, 459

[56] References Cited

U.S. PATENT DOCUMENTS

| | | | |
|---|---|---|---|
| 3,657,472 | 4/1972 | Taudt et al. | 358/75 |
| 3,742,129 | 6/1973 | Roberts et al. | |
| 3,911,480 | 10/1975 | Brocker | 358/75 |
| 4,081,828 | 3/1978 | Jones et al. | 358/298 |
| 4,084,183 | 4/1978 | Keller et al. | 358/75 |
| 4,149,183 | 4/1979 | Pellar et al. | |
| 4,246,614 | 1/1981 | Knox | 358/298 |
| 4,456,924 | 6/1984 | Rosenfield | 358/75 |
| 4,499,489 | 2/1985 | Gall et al. | 358/75 |
| 4,543,613 | 9/1985 | Sakamoto | 358/75 |
| 4,626,901 | 12/1986 | Tanioka | 358/75 |
| 4,700,235 | 10/1987 | Gall | 358/298 |
| 4,843,408 | 6/1989 | Tanaka | 358/298 |
| 4,916,545 | 4/1990 | Granger | 358/78 |
| 4,924,301 | 5/1990 | Surbrook | 358/454 |
| 4,926,267 | 5/1990 | Shu et al. | 358/454 |
| 4,942,480 | 7/1990 | Shu | 358/454 |

OTHER PUBLICATIONS

"Dictionary of Printing", (The Japanese Society of Printing Science and Technology, 1987), p. 241.
Shigeru Hasegawa, "Photo-Engraving Process Techniques", (Institute for Printing Process, 1979), pp. 158–159.
"35 Years of Image Processing Technique", (Dainippon Screen Mfg. Co., Ltd., 1978), p. 73.

Primary Examiner—Howard W. Britton
Assistant Examiner—Michael H. Lee
Attorney, Agent, or Firm—Lowe, Price, Leblanc and Becker

[57] ABSTRACT

A printed image ($I_{t4}$) is produced with halftone images for respective color printers while so-called rosette moire and a color shift from an original iamge are prevented. Halftone dots ($H_{m4}$, $H_{c4}$, $H_{k4}$) are formed in linear shapes extending in respective prescribed directions, thereby forming parallel lines with respective intervals ($d_{m4}$, $d_{c4}$, $d_{k4}$). These extensional directions and intervals of parallel lines are so established that they effectively prevent the rosette moire and the color shift.

46 Claims, 27 Drawing Sheets $d_{m3} \neq d_{c3} \neq d_{k3}$

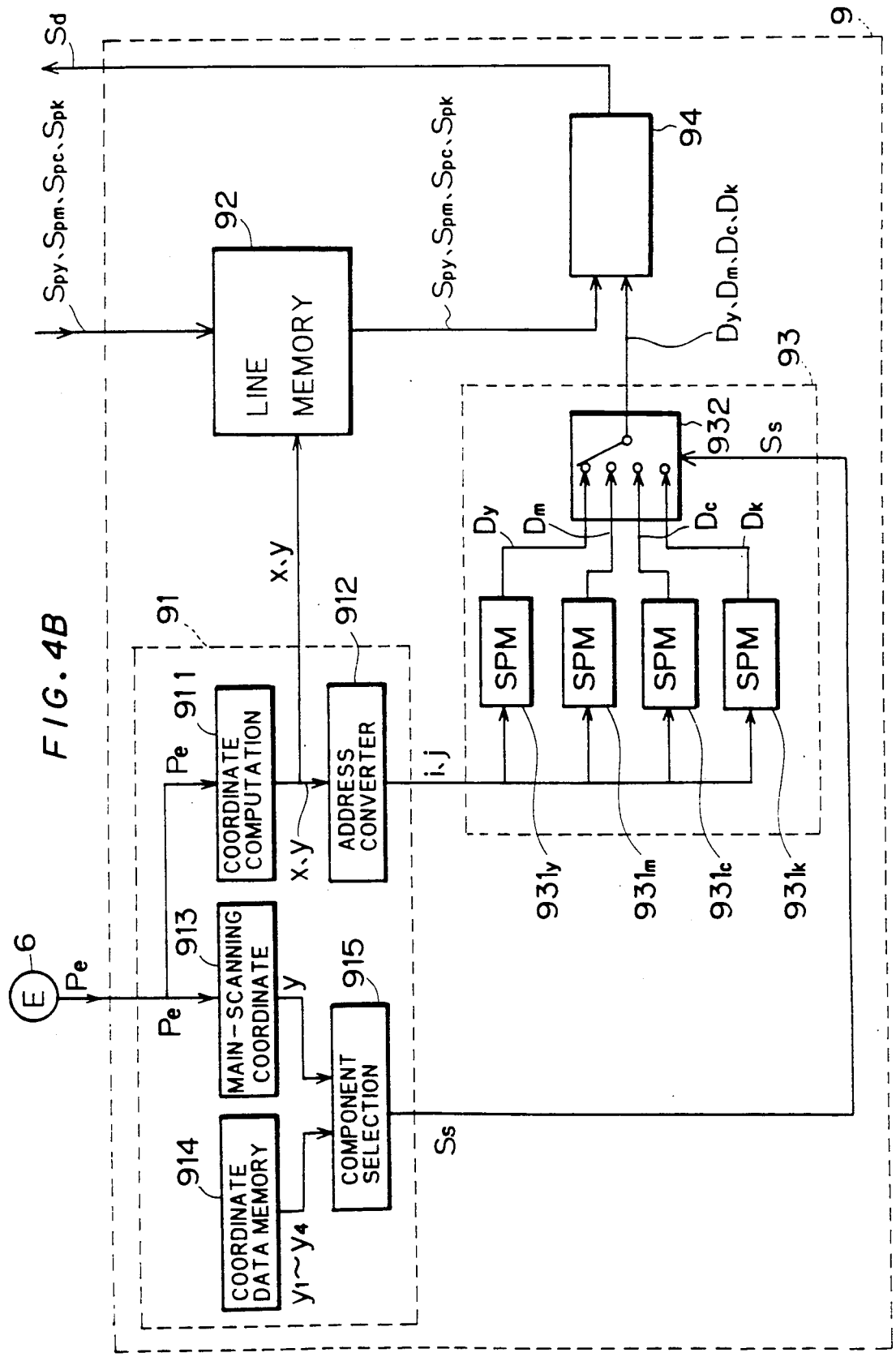

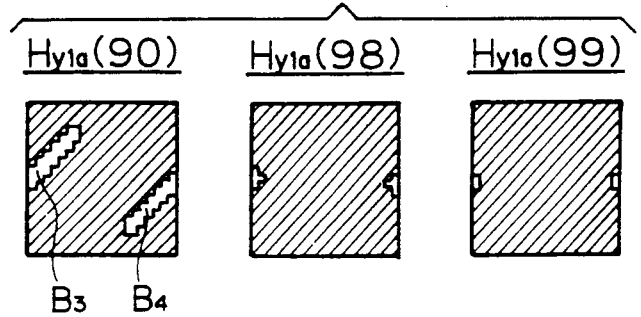
FIG. 6B(a)
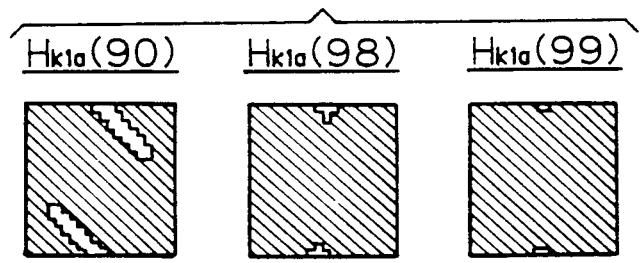
FIG. 6B(b)
FIG. 7
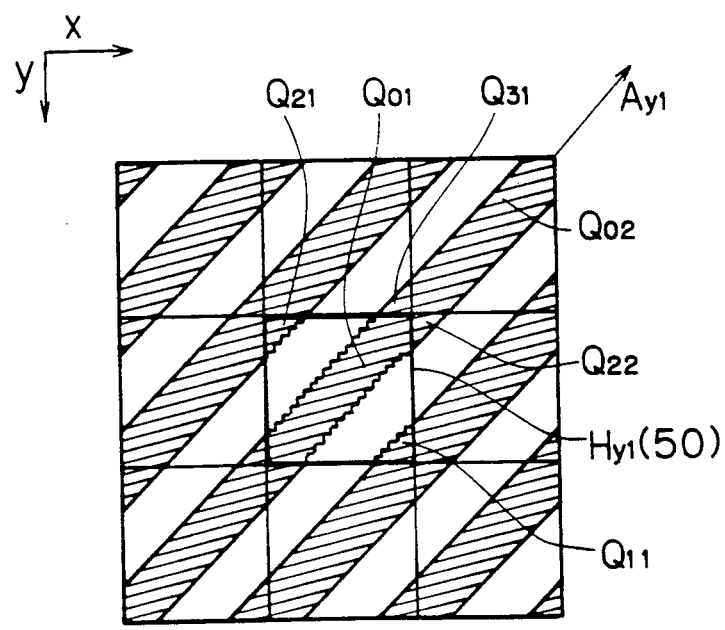

F I G. 11A
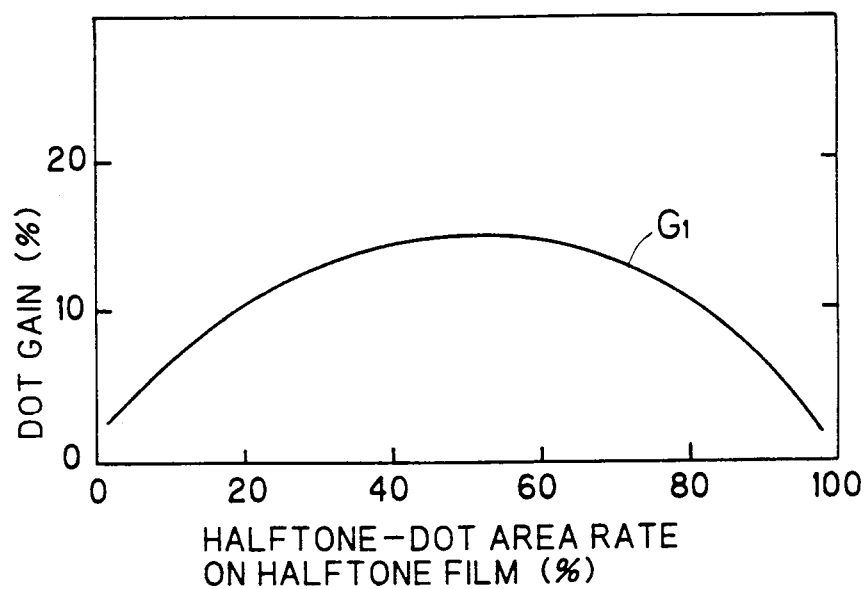
F I G. 11B
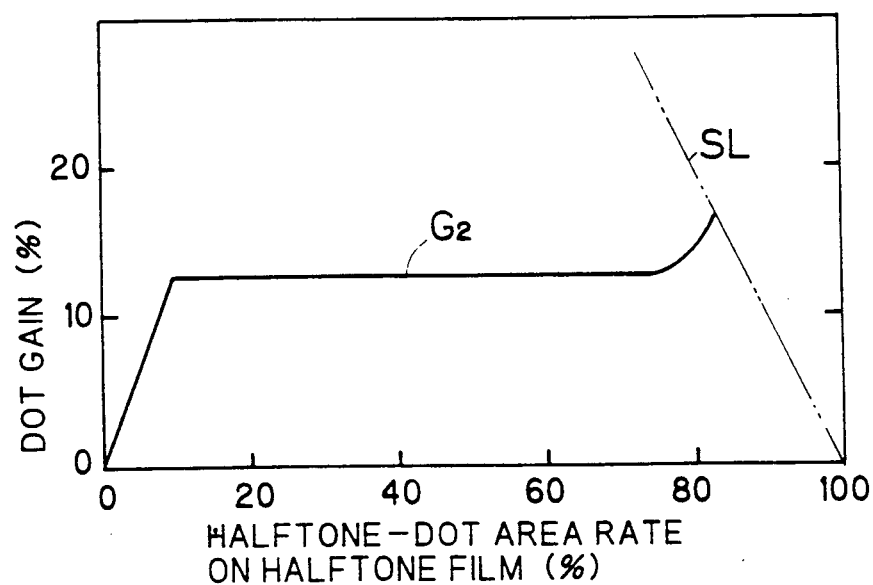

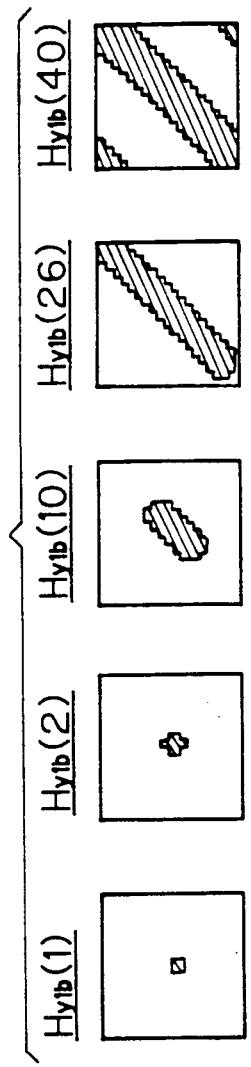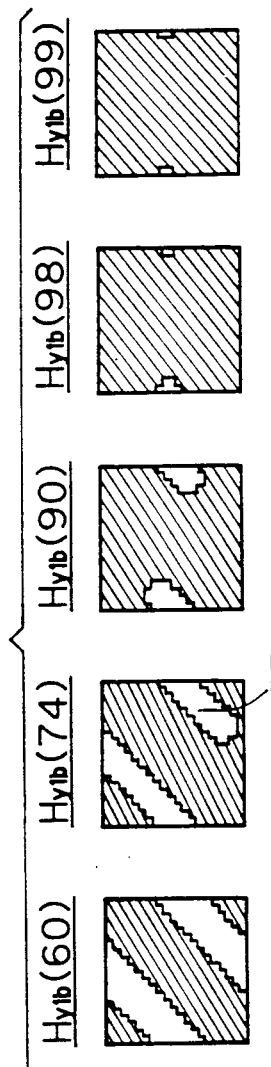
FIG. 12(a-1)
FIG. 12(a-2)
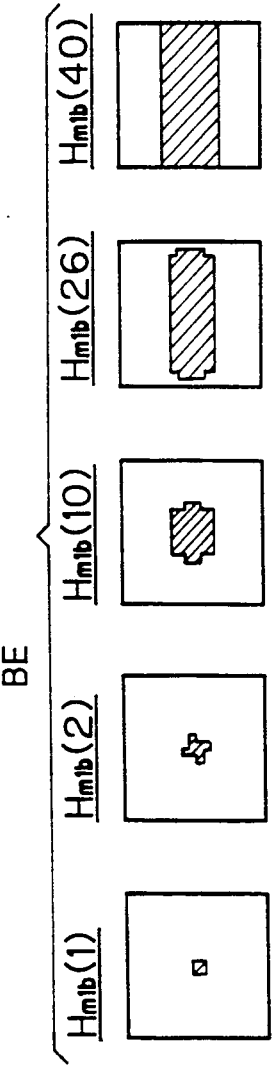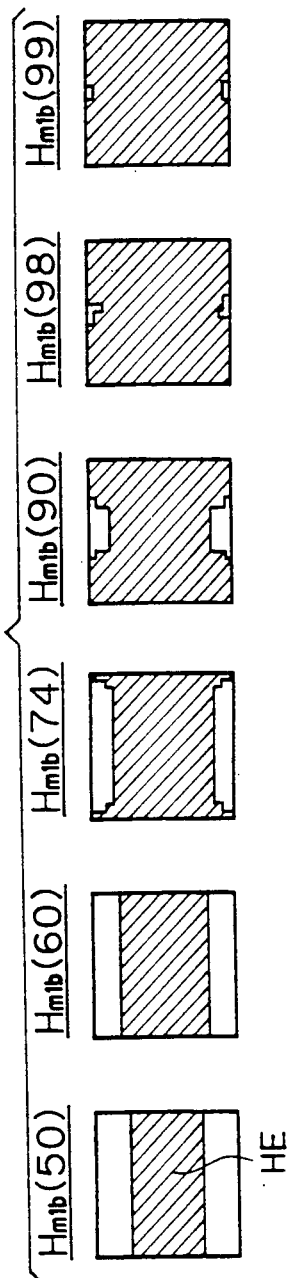
FIG. 12(b-1)
FIG. 12(b-2)

HE

BE1 BE2

$d_{m4} < d_{k4}$ $d_{c4} < d_{k4}$

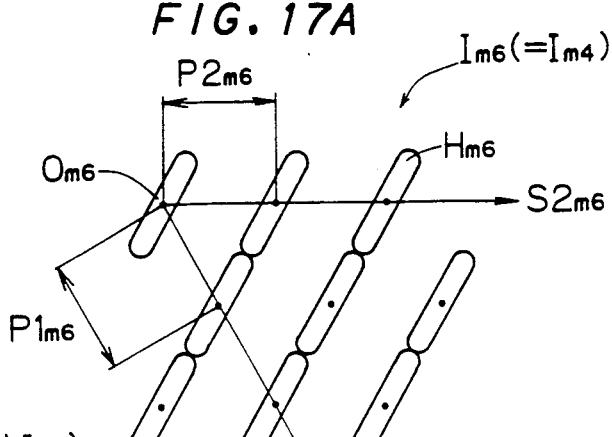
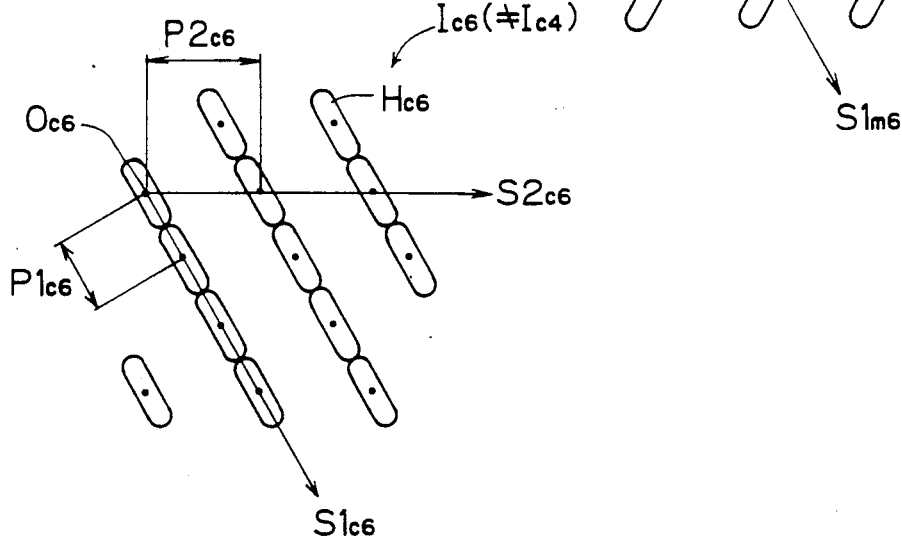
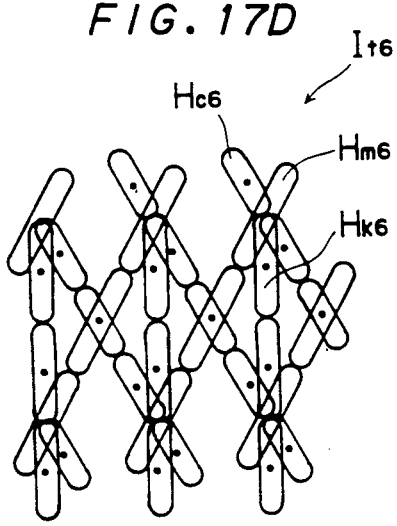
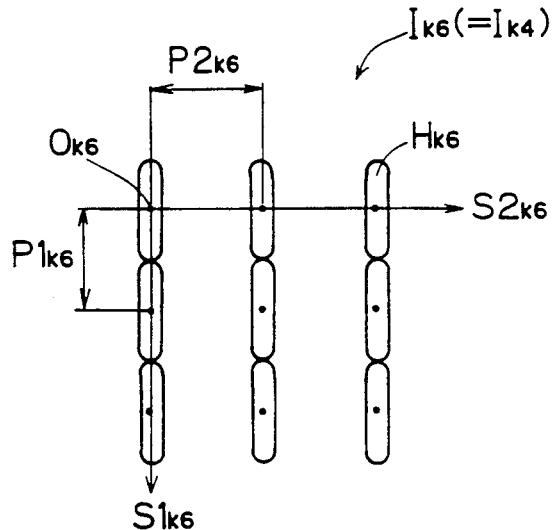

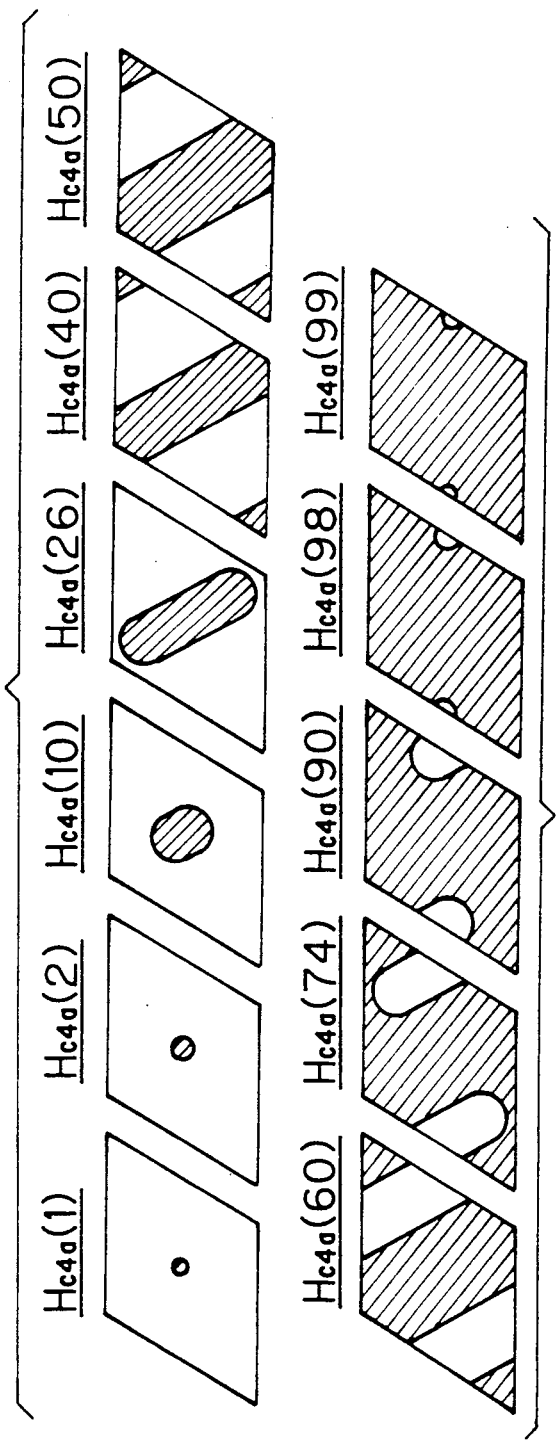

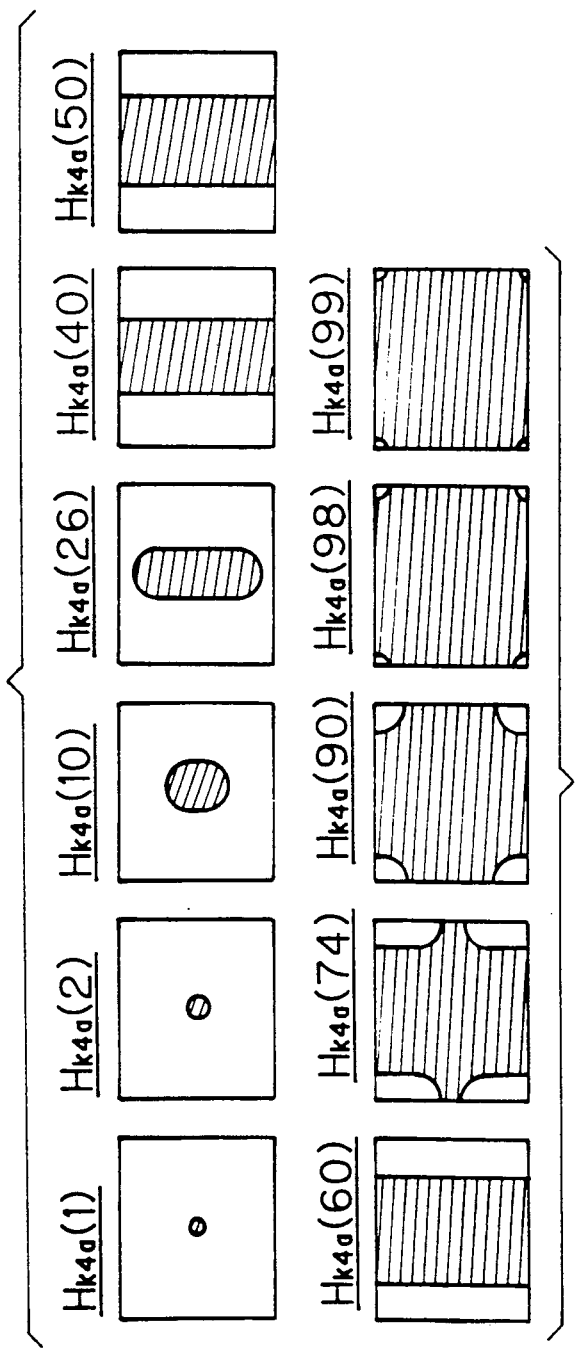

METHOD OF AND APPARATUS FOR RECORDING HALFTONE IMAGES AND HALFTONE IMAGES PRODUCED THEREBY

BACKGROUND OF THE INVENTION

1. Field of the Invention

The present invention relates to a method of and an apparatus for recording halftone images to be employed in reproducing a color image, and more particularly, it relates to a method and an apparatus which can prevent a rosette moire from appearing in the reproduced color image. The present invention also relates to halftone images produced thereby.

2. Description of the Prior Art

A color original image having continuous color tone is reproduced by: firstly obtaining color separation images of the original, secondly producing halftone images of respective color separation images, and finally printing the halftone images with respective color inks. When the halftone images have common screen structure, or common arrangement of haltone dots, the printed matter is liable to have a color shift caused by registering mismatch of the halftone images against each other on a printing paper. The color shift denotes a visual change in color tone of a printed image from that of an original image. Therefore, in conventional methods, the halftone images have respective screen structure with respective screen angles, for example, such as 0°, 15°, 45°, and 75°.

However, when the plural halftone images having respective screen angles are printed on a single printing paper, small circular patterns appear on the printed matter because of the differences among the screen angles. The circular patterns are called rosette moire. Although each circle of the rosette moire is weak and small, it reduces quality of a printed matter because it appears in a considerably large area. Therefore, a method of recording halftone images which can prevent the rosette moire and an apparatus therefore has been an issue in this field.

SUMMARY OF THE INVENTION

The present invention is directed to a method of an an apparatus for recording halftone images to be employed in reproducing a color image. The halftone images comprise at least two halftone images including (a) a first halftone image of a first color having a prescribed screen angle and a prescribed screen pitch, halftone dot elements in the first halftone image being formed in a linear shape extending in a first extensional direction, and (b) a second halftone image of a second color having the prescribed screen angle and the prescribed screen pitch, halftone dot elements in the second halftone image being formed in a linear shape extending in a second extensional direction different from the first extensional direction.

According to an aspect of the present invention, the halftone images further comprise a third halftone image of a third color having the prescribed screen angle and the prescribed screen pitch, halftone dot elements in the third halftone image being formed in a linear shape extending in a third extensional direction different from the first and second extensional directions, halftone dot centers of each of the first to third halftone images form a lattice in the shape of a parallelogram, the first and second extensional directions agree with directions of two adjacent sides of the parallelogram, respectively, and the third extensional direction agrees with a direction of one of two diagonals of the parallelogram.

The halftone dot centers of each of the first to third halftone images may be placed, on an image plane of a reproduced image to be produced with the first to third halftone images, at the same positions as the halftone dot centers of the rest of the first to third halftone images.

Instead, the halftone dot centers of each of the first to third halftone images may be placed, on an image plane of a reproduced image to be produced with the first to third halftone images, at different positions from positions at which the halftone dot centers of the rest of the first to third halftone images are placed.

According to another aspect of the present invention, the halftone image comprises (a) a first halftone image of a first color, halftone dot elements in the first halftone image being formed in a linear shape extending in a first extensional direction to thereby form parallel lines with a first interval, (b) a second halftone image of a second color, halftone dot elements in the second halftone image being formed in a linear shape extending in a second extensional direction different from the first extensional direction to thereby form parallel lines with a second interval, and (c) a third halftone image of a third color, halftone dot elements in the third halftone image being formed in a linear shape extending in a third extensional direction different from the first and second extensional directions to thereby form parallel lines with a third interval, the third extensional direction agreeing with a direction of longer diagonal out of two diagonals of a minimum parallelogram which is formed of the parallel lines in the first and second halftone images, a pitch of the parallel lines in the third halftone image which is measured in a direction of a shorter diagonal out of the two diagonals of the minimum parallelogram being equal to a length of the shorter diagonal. In this aspect, differences between the first to third intervals are preferably at most about 20 percent.

Preferably, the halftone dot elements have isolated shapes in each of the halftone images at the halftone-dot area rate of at most about 25 percent, and blank areas where the halftone dot elements do not exist have isolated shapes in each of the halftone images at the halftone-dot area rate of at least about 75 percent. The first to third halftone images may be halftone images for magenta ink, cyan ink and black ink in arbitrary order.

The present invention is also directed to the halftone images themselves and a printed image produced therefrom.

Accordingly, an object of the present invention is to prevent the rosette moire and the color shift in a printed image.

In this specification, a "lattice" denotes one whose lattice points are defined to be intersections of two sets of parallel lines which have respective regular intervals and which are drawn through centers of halftone dots. The lattice will be also referred to as "screen lattice". The screen lattice is not limited to a square lattice, but it also includes a parallelogram lattice, as will be shown in FIG. 5E, and the like.

A "screen pitch" denotes each length of two adjacent sides of a unit lattice in a parallelogram lattice. A "screen angle" denotes either of two angles between a horizontal line and each of the two adjacent sides of the parallelogram unit lattice; one of the two adjacent sides is selected for each halftone image to define the screen angle. The screen pitch and the screen angle will be described later in detail.

"Halftone images" have small dots (or halftone dots) which are located at the lattice points of the screen lattice and whose size and shape vary according to density of an original image having continuous color tone. The halftone dots will be also referred to as "halftone-dot elements". The shape of a halftone dot is not limited to a square.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A through 4B are block diagrams showing the structure of a color scanner employed in the preferred embodiments;

FIGS. 6A, 6B and 9 illustrate varying shapes of halftone dots in the first preferred embodiment;

FIG. 7 illustrates 3×3 matrix of halftone dots in the first preferred embodiment;

FIG. 11A illustrates a characteristic curve of dot gain for the conventional halftone dot;

FIGS. 11B and 11C illustrate characteristic curves of dot gain for the halftone dots according to the first preferred embodiment;

FIG. 12 illustrates modified shapes of halftone dots in the first preferred embodiment;

FIGS. 17A through 17D illustrate still another configuration of halftone dots in the second preferred embodiment; and FIGS. 18A through 18C illustrate varying shapes of halftone dots in the second preferred embodiment.

DESCRIPTION OF THE PREFERRED EMBODIMENT

Figure 1B:
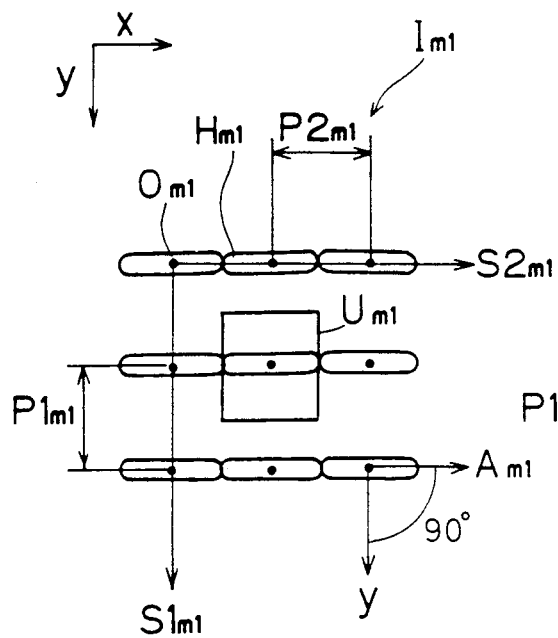
FIGS. 1A through 1H illustrate the configuration of halftone dots employed in a first preferred embodiment of the present invention.
Figure 1A:
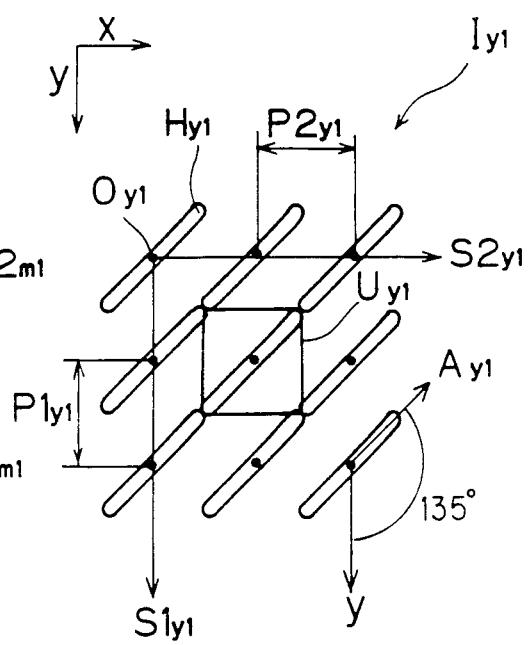
Figure 1D:
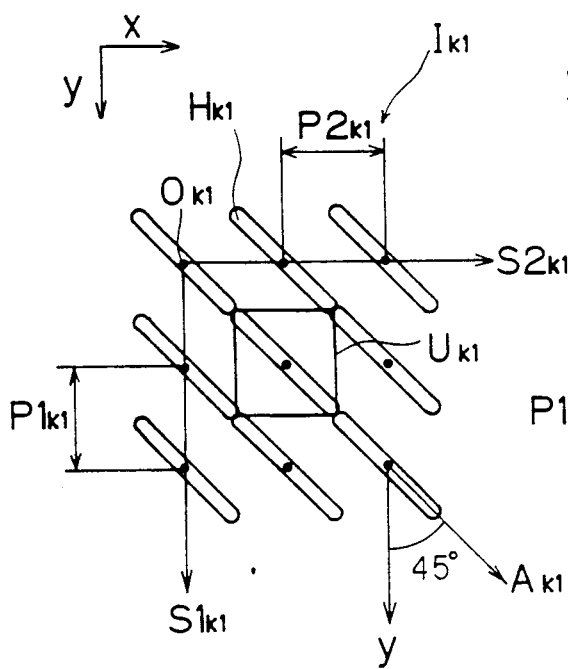
Figure 1C:
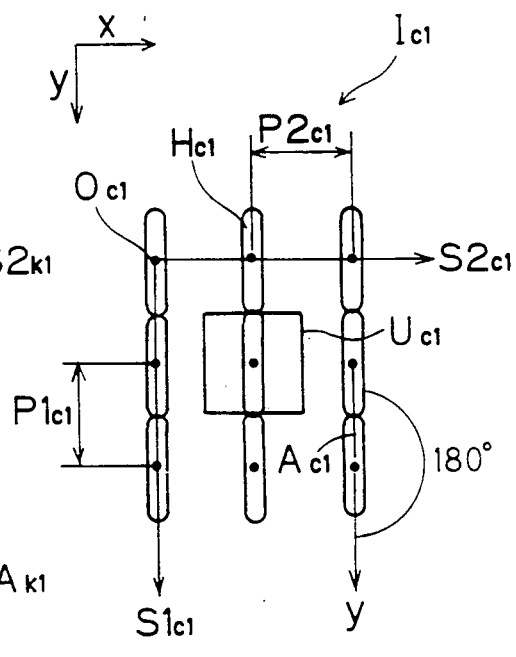

Basic consideration taken in a first preferred embodiment of the present invention will be first explained.

The rosette moire appears when plural halftone images to be overprinted have respective regular screen structure with respective screen angles. Therefore, if the screen angles of the halftone images are equal to each other, the rosette moire can be prevented. However, if the plural halftone images have a common screen pitch and a common screen angle, and if they have a common shape of a halftone dot, a color shift is liable to appear in a printed image because of registering mismatch of the halftone images on a printed paper. For example, in printing a gray image with yellow, magenta and cyan printers, if the registering mismatch occurs on the yellow printer and yellow ink is deposited on the area where magenta and cyan inks are not deposited, a printed image, which should be gray, is covered with yellow hue all over.

Therefore, in the first preferred embodiment of the present invention, plural halftone images employ a common screen angle and a common screen pitch, and in addition, halftone dots of each halftone image are formed in a linear shape in a prescribed direction which is different from that of the other halftone images. This reduces size of areas where plural color inks are overlayed, and thereby reduces a change of the size of these areas caused by the registering mismatch. Accordingly, the color shifts as well as the rosette moire are prevented.

FIGS. 1A through 1H illustrate the configuration of halftone dots employed in the first preferred embodiment of the present invention. FIGS. 1A through 1D correspond to parts of respective halftone images for yellow (Y), magenta (M), cyan (C) and black (K) inks. These halftone images $I_{y1}$, $I_{m1}$, $I_{c1}$ and $I_{k1}$ have a halftone-dot area rate of about 15 percent.

The halftone images $I_{y1}$, $I_{m1}$, $I_{c1}$ and $I_{k1}$ consist of respective halftone dots $H_{y1}$, $H_{m1}$, $H_{c1}$ and $H_{k1}$ which have linear shapes extending in respective specific directions $A_{y1}$, $A_{m1}$, $A_{c1}$ and $A_{k1}$ (these directions will be hereinafter referred to as "extensional directions"). Each of the halftone dots $H_{y1}$, $H_{m1}$, $H_{c1}$ and $H_{k1}$ is connected with adjacent halftone dots in the specific extensional direction at the halftone-dot area rate of more than a prescribed value. The prescribed value is usually from 10 to 15 percent. The connected halftone dots form parallel lines in each of the halftone images $I_{y1}$, $I_{m1}$, $I_{c1}$ and $I_{k1}$.

The linear shape of the halftone dots are called "cut line" in the field. The conventional halftone-dot formation of the cut line employs various screen angles to respective halftone images. On the other hand, the first embodiment of the present invention employs a common screen angle to all of the halftone images.

The screen angle, in general, is defined to be the smaller one of two angles which are measured counterclockwise between a horizontal line and two axes ($S1_{y1}$ and $S2_{y1}$ in FIG. 1A) of the screen lattice, whose lattice points consist of centers of the halftone dots. In this specification, however, the screen angle is defined to be the smallest of plural angles which are measured counterclockwise from a main scanning direction y to plural axes specifying a screen lattice. The screen angles of the halftone images $I_{y1}$, $I_{m1}$, $I_{c1}$ and $I_{k1}$ shown in FIGS. 1A through 1D are all zero degree according to the definition. Further, angles from first lattice axes $S1_{y1}$, $S1_{m1}$, $S1_{c1}$ and $S1_{k1}$ to respective second lattice axes $S2_{y1}$, $S2_{m1}$, $S2_{c1}$ and $S2_{k1}$ are equal to each other. The "common screen angle" in this specification means that the angles from the first lattice axes $S1_{y1}$ through $S1_{k1}$ to the respective second lattice axes $S2_{y1}$ through $S2_{k1}$ are equal to each other and that the screen angles defined for respective halftone images $I_{y1}$ through $I_{k1}$ according to a common definition are equal to each other.

First screen pitches are defined to be distances $P1_{y1}$, $P1_{m1}$, $P1_{c1}$ and $P1_{k1}$ between two adjacent centers of halftone dots along the first lattice axes $S1_{y1}$ through $S1_{k1}$, respectively. Second screen pitches are defined to be distances $P2_{y1}$, $P2_{m1}$, $P2_{c1}$ and $P2_{k1}$ between two adjacent centers of halftone dots along the second lattice axes $S2_{y1}$ through $S2_{k1}$, respectively. In FIGS. 1A through 1D, the first screen pitches $P1_{y1}$ through $P1_{k1}$ are equal to the second screen pitches $P2_{y1}$ through $P2_{k1}$ as follows:

$$P1_{y1} = P1_{m1} = P1_{c1} = P1_{k1} = K_1 \quad (1)$$

$$P2_{y1} = P2_{m1} = P2_{c1} = P2_{k1} = K_2 \quad (2)$$

$$K_1 = K_2 \quad (3)$$

where $K_1$ and $K_2$ are constants.

The halftone images $I_{y1}$ through $I_{k1}$ are further characterized by having the extensional directions $A_{y1}$, $A_{m1}$, $A_{c1}$ and $A_{k1}$ different from each other. More specifically, the extensional directions $A_{y1}$ through $A_{k1}$ for the halftone dots $H_{y1}$ through $H_{k1}$ are oriented 135°, 90°, 180° (or 0°) and 45°, respectively, away from the main scanning direction y.

Figure 1E:
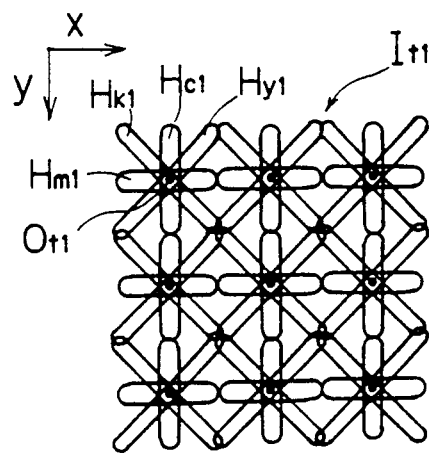

On the basis of the halftone images $I_{y1}$ through $I_{k1}$ which have a common screen angle, a common screen pitch and the respective extensional directions $A_{y1}$ through $A_{k1}$ different form each other, a reproduced image $I_{t1}$ shown in FIG. 1E can be printed. The reproduced image $I_{t1}$ is produced by placing the centers $O_{y1}$, $O_{m1}$, $O_{c1}$ and $O_{k1}$ of the respective halftone dots $H_{y1}$ through $H_{k1}$ at a single point $O_{t1}$ on an image plane. Because the extensional directions of the respective halftone dots $H_{y1}$ through $H_{k1}$ are different from each other, the areas where the halftone dots overlap each other are small. Therefore, even if the positions of the halftone dots are displaced because of the registering mismatch, the size of the overlapping areas does not change so much while their positions are shifted somewhere else from around the points $O_{t1}$; this prevents the color shift to be caused by the registering mismatch.

Figure 1F:
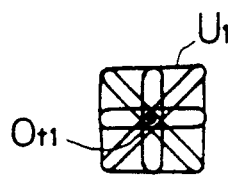

The reproduced image $I_{t1}$ is composed of a plurality of a unit area $U_1$ formed around the halftone-dot center $O_{t1}$ as shown in FIG. 1F. The unit area $U_1$ has a particular shape of halftone dot at the halftone-dot area rate of 100 percent. The particular shape will be hereinafter referred to as "100%-halftone-dot shape". The 100%-halftone-dot shapes $U_{y1}$, $U_{m1}$, $U_{c1}$ and $U_{k1}$, which conform to the unit area $U_1$, are shown in FIGS. 1A through 1D. Because the reproduced image $I_{t1}$ is formed to be a repetitional pattern of the square unit area $U_1$ which is a minimum possible unit for repetition, the rosette moire is prevented in the reproduced image $I_{t1}$.

Although all of the halftone images $I_{y1}$ through $I_{k1}$ have a common screen angle and a common screen pitch, the halftone image $I_{y1}$ for a yellow printer may have different screen structure because the halftone image $I_{y1}$ has loosely related to the rosette moire. (In other words, the halftone images for magenta, cyan and black printers are closely related to the rosette moire). The screen angle of the halftone image $I_{y1}$ may be set at 15 degrees or 30 degrees, for example. It is better to make the extensional direction of halftone dots $H_{y1}$ equal to one of the lattice axes; this is achieved by rotating the image of FIG. 1A by 15 degrees or 30 degrees. This screen structure of the halftone image $I_{y1}$ causes the areas where the halftone dots $H_{y1}$ are largely or scarcely overlapping with the halftone dots $H_{m1}$, $H_{c1}$ and $H_{k1}$ to spread averagely all over the reproduced image, thereby preventing the color shift.

The extensional directions $A_{m1}$, $A_{c1}$ and $A_{k1}$ of the halftone dots $H_{m1}$, $H_{c1}$ and $H_{k1}$ which are closely related to the rosette moire have special relation among themselves. More specifically, the extensional direction $A_{k1}$ divides the angle between the extensional directions $A_{m1}$ and $A_{c1}$ into halves. This relation causes the halftone dots of respective colors to appear equally, thereby improving the effect of preventing the color shift.

Figure 1H:
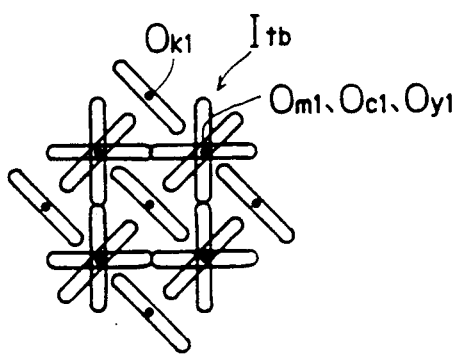
Figure 1G:
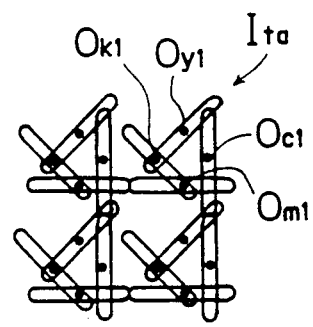

In FIG. 1E, the halftone-dot centers $O_{y1}$ through $O_{k1}$ of the respective halftone images $I_{y1}$ through $I_{k1}$ are commonly placed in the point $O_{t1}$ on the reproduced image $I_{t1}$; however, these halftone dot centers can be placed at respective points different from each other. FIGS. 1G and 1H illustrate reproduced images where the halftone-dot centers $O_{y1}$ through $O_{k1}$ are not placed at common points. The reproduced image $I_{ta}$ shown in FIG. 1G has the halftone-dot centers $O_{y1}$ through $O_{k1}$ placed at respective points different from each other. According to this configuration, the halftone dots $H_{y1}$ through $H_{k1}$ do not overlap each other when the halftone-dot area rate is comparatively low, about a few percent, for example. Consequently, the color shift is hard to occur and the quality of the reproduced image is improved. Another configuration can be made as shown in FIG. 1H, where the halftone-dot center $O_{k1}$ of only one color ink (K) is placed at a different point from the other three halftone-dot centers $O_{y1}$, $O_{m1}$ and $O_{c1}$.

Figure 2A:
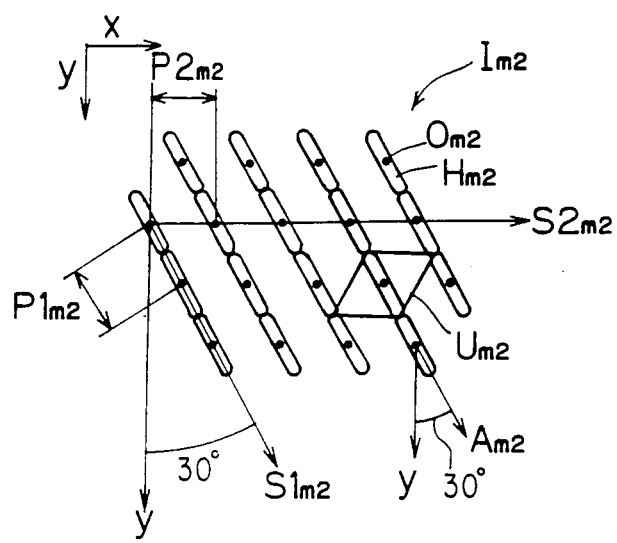
FIGS. 2A through 2F illustrate another configuration of halftone dots in the first preferred embodiment.
Figure 2B:
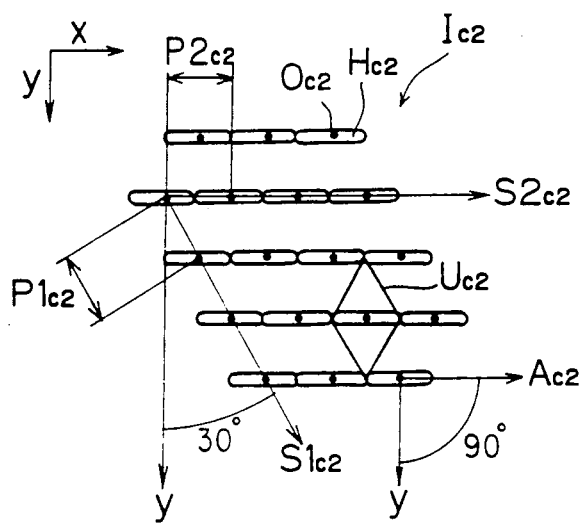
Figure 2C:
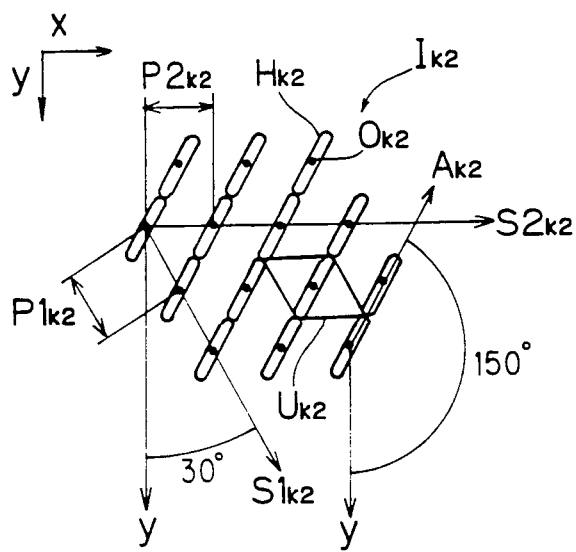

FIGS. 2A through 2F illustrate the configuration of halftone dots employed in another example of the first embodiment of the present invention. FIGS. 2A through 2C illustrate halftone images $I_{m2}$, $I_{c2}$ and $I_{k2}$ for magenta, cyan and black printers, respectively. Each screen structure of the halftone images $I_{m2}$ through $I_{k2}$ is composed of a screen lattice of a parallelogram shape. All of the first lattice axes $S1_{m2}$, $S1_{c2}$ and $S1_{k2}$ are in the direction 30 degrees away from the main scanning direction y. That is, all of the screen angles of the halftone images $I_{m2}$ through $I_{k2}$ are 30 degrees.

These halftone images $I_{m2}$ through $I_{k2}$ also have common screen pitches as follows:

$$P1_{m2} = P1_{c2} = P1_{k2} = K_3 \quad (4)$$

$$P2_{m2} = P2_{c2} = P2_{k2} = K_4 \quad (5)$$

$$K_3 = K_4 \quad (6)$$

where $P1_{m2}$, $P1_{c2}$ and $P1_{k2}$ denote first screen pitches, $P2_{m2}$, $P2_{c2}$, $P2_{k2}$ denote second screen pitches, and $K_3$ and $K_4$ denote constants representing the values of the first and second screen pitches, respectively.

Further, the extensional directions $A_{m2}$, $A_{c2}$ and $A_{k2}$ of the halftone dots $H_{m2}$, $H_{c2}$ and $H_{k2}$ are different from each other. Namely, they are inclined at 30°, 90°, and 150° away from the main scanning direction y, respectively. These extensional directions $A_{m2}$ through $A_{k2}$ have the relation such that one of the extensional directions divides the angle between the other two extensional directions in halves. This relation is, as described before, effective to prevent the color shift.

Figure 2D:
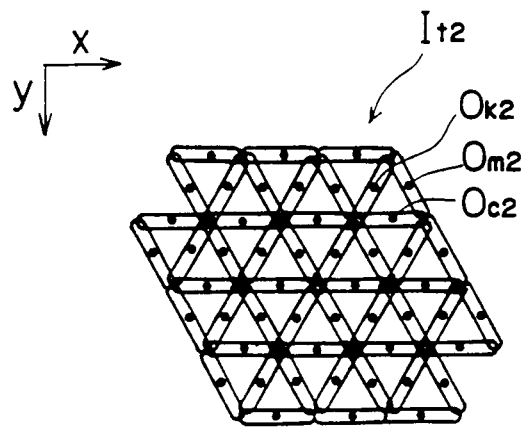
Figure 2E:
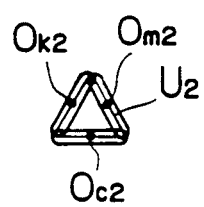

FIG. 2D illustrates a reproduced image $I_{t2}$ produced with the halftone images $I_{m2}$ through $I_{k2}$. On the image plane of the reproduced image $I_{t2}$, halftone-dot centers $O_{m2}$ through $O_{k2}$ of the halftone dots $H_{m2}$ through $H_{k2}$ are placed at respective positions different form each other. FIG. 2E illustrates a unit area $U_2$ of the reproduced image $I_{t2}$. The unit area $U_2$ has a shape of an equilateral triangle. The halftone-dot centers $O_{m2}$ through $O_{k2}$ are placed at central points of the sides of the equilateral triangle. Incidentally, 100%-halftone-dot shape $U_{m2}$, $U_{c2}$ and $U_{k2}$ of the halftone dots $H_{m2}$, $H_{c2}$ and $H_{k2}$ have a parallelogram shape as shown in FIGS. 2A through 2C. The unit area $U_2$ is a half of the parallelogram.

FIG. 2E does not include halftone dots of a yellow printer. Since the yellow color is loosely related to the rosette moire, the screen angle of the halftone image for the yellow printer can be set at a different value from that of the other halftone images $I_{m2}$, $I_{c2}$ and $I_{k2}$; this is even desirable to prevent the color shift, as described before.

Figure 2F:
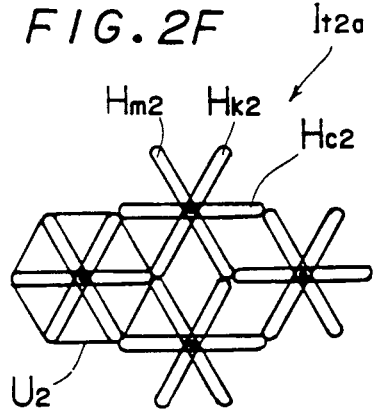

FIG. 2F illustrates another reproduced image $I_{t2a}$ produced with halftone dots $H_{m2a}$, $H_{c2a}$, and $H_{k2a}$ each of which has the screen lattice of a parallelogram shape. The centers of the halftone dots $H_{m2a}$, $H_{c2a}$ and $H_{k2a}$ are placed at a same point. The unit area $U_3$ of the reproduced image $I_{t2a}$ has a shape of a hexagon which conforms to the 100%-halftone-dot shapes of the halftone dots $H_{m2a}$, $H_{c2a}$ and $H_{k2a}$.

Although the first screen pitch is equal to the second screen pitch in each of the halftone images shown in FIGS. 1A through 1H and 2A through 2F, they may have different values from each other. FIGS. 3A through 3E illustrate the configuration of halftone dots whose first and second screen pitches are different from each other. The relation between the first screen pitches $P1_{m3}$, $P1_{c3}$ and $P1_{k3}$ and the second screen pitches $P2_{m3}$, $P2_{c3}$ and $P2_{k3}$ of the respective halftone images $I_{m3}$, $I_{c3}$ and $I_{k3}$ are expressed as follows:

$$P1_{m3} = P1_{c3} = P1_{k3} = K_5 \qquad (7)$$

$$P2_{m3} = P2_{c3} = P2_{k3} = K_6 \qquad (8)$$

$$K_5 \neq K_6 \qquad (9)$$

Even in this case, the halftone images $I_{m3}$ through $I_{k3}$ have a common screen pitch. The "common screen pitch" in this specification means that the first screen pitches $P1_{m3}$ through $P1_{k3}$ are equal to each other and that the second screen pitches $P2_{m3}$ through $P2_{k3}$ are equal to each other, while the values $K_5$ and $K_6$ of the first and second screen pitches may be different from each other.

The extensional directions $A_{m3}$, $A_{c3}$ and $A_{k3}$ of the respective halftone dots $H_{m3}$, $H_{c3}$ and $H_{k3}$ are different from each other; they are inclined at 30°, 90°, and 170° away from the main scanning direction $\underline{y}$, respectively. FIG. 3D illustrates a reproduced image $I_{t3}$ produced with the three halftone images $I_{m3}$ through $I_{k3}$. The halftone-dot centers $O_{m3}$, $O_{c3}$ and $O_{k3}$ are placed at a same position in FIG. 3D. However, even if the halftone-dot centers are placed at respective positions different form each other, the rosette moire and the color shift are prevented similarly to the case with FIGS. 1G, 1H and 2D.

Figure 3B:
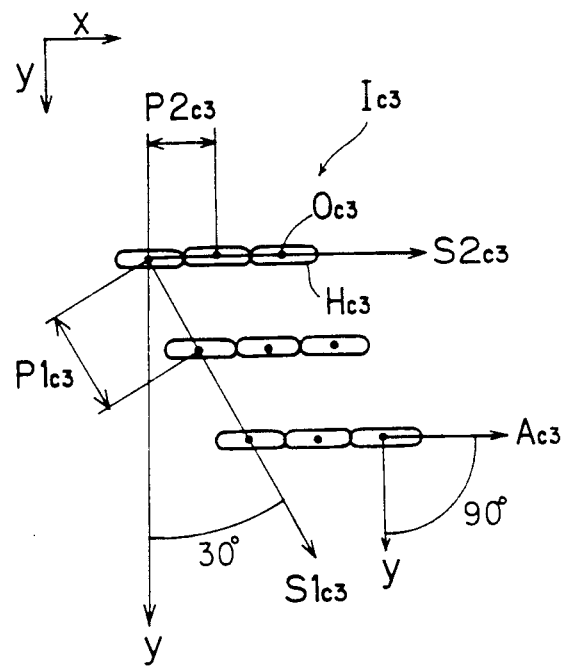
FIGS. 3A through 3E illustrate still another configuration of halftone dots in the first preferred embodiment.
Figure 3A:
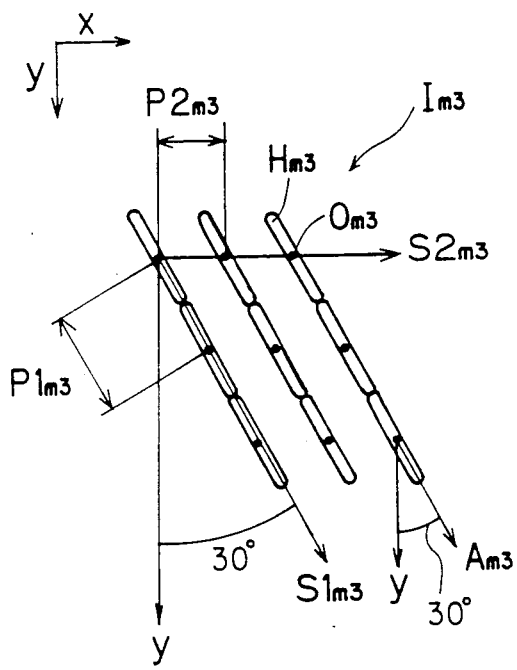
Figure 3C:
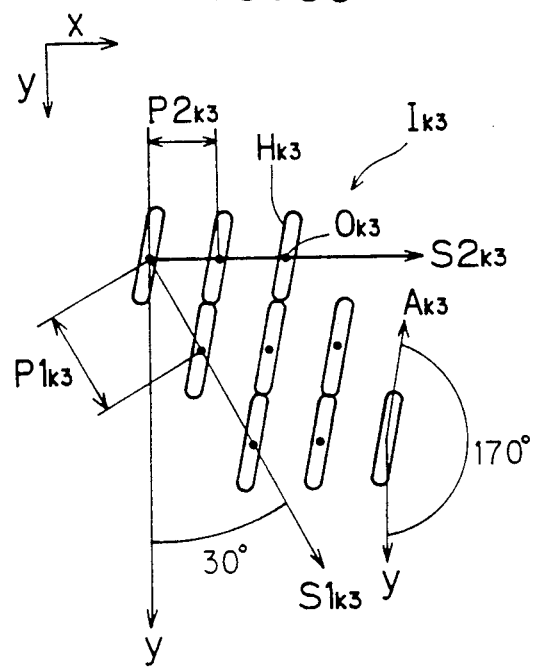
Figure 3D:
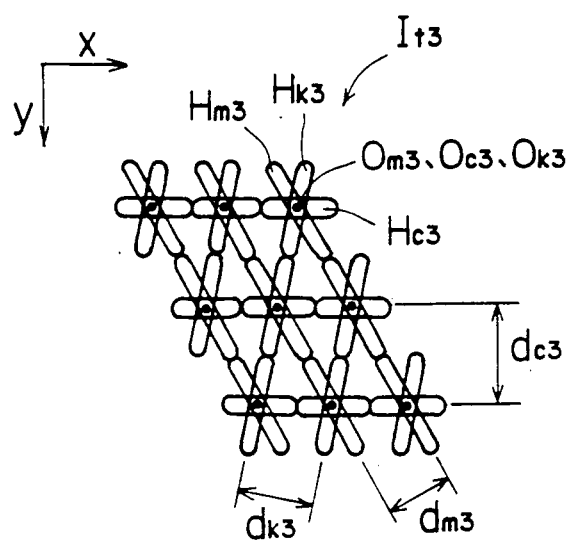
Figure 3E:
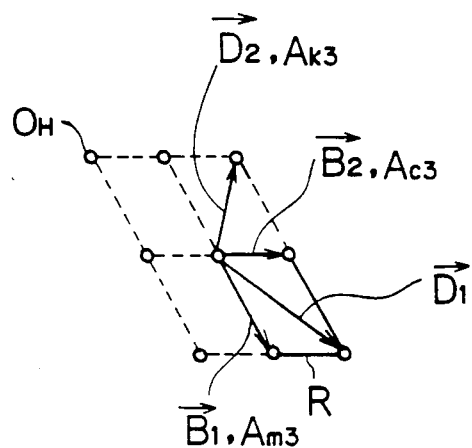

FIG. 3E illustrates the structure of the screen lattices of the halftone images $I_{m3}$ through $I_{k3}$ and the extensional directions $A_{m3}$ through $A_{k3}$ therein. The halftone-dot centers $O_H$, which correspond to the halftone-dot centers $O_{m3}$, $O_{c3}$ and $O_{k3}$, are lattice points of the screen lattice, and form a unit lattice R of a parallelogram shape whose sides are represented by two unit vectors $\vec{B_1}$ and $\vec{B_2}$. The screen lattice is formed by arranging the unit lattices R two-dimensionally. The unit vector $\vec{B_1}$ has the same direction as the first lattice axes $S1_{m3}$ through $S1_{k3}$ and the same length as the first screen pitches $P1_{m3}$ through $P1_{k3}$. The unit vector $\vec{B_2}$ has the same direction as the second lattice axes $S2_{m3}$ through $S2_{k3}$ and the same length as the second screen pitches $P2_{m3}$ through $P2_{k3}$. The extensional directions $A_{m3}$ and $A_{c3}$ agree with those of the unit vectors $\vec{B_1}$ and $\vec{B_2}$, respectively. The extensional direction $A_{k3}$ agrees with a vector $\vec{D_2}$ out of the two vectors $\vec{D_1}$ and $\vec{D_2}$ representing the diagonal lines of the parallelogram R. In other words, two extensional directions $A_{m3}$ and $A_{c3}$ out of the three extensional directions $A_{m3}$ through $A_{k3}$ are set to agree with the directions of the two sides of the parallelogram unit lattice R, and the residual extensional direction $A_{k3}$ is set to the direction of one of the diagonal lines of the unit lattice R; this reduces the areas where the halftone dots $H_{m3}$ through $H_{k3}$ overlap each other as shown in FIG. 3D, thereby effectively preventing the color shift.

Figure 4A:
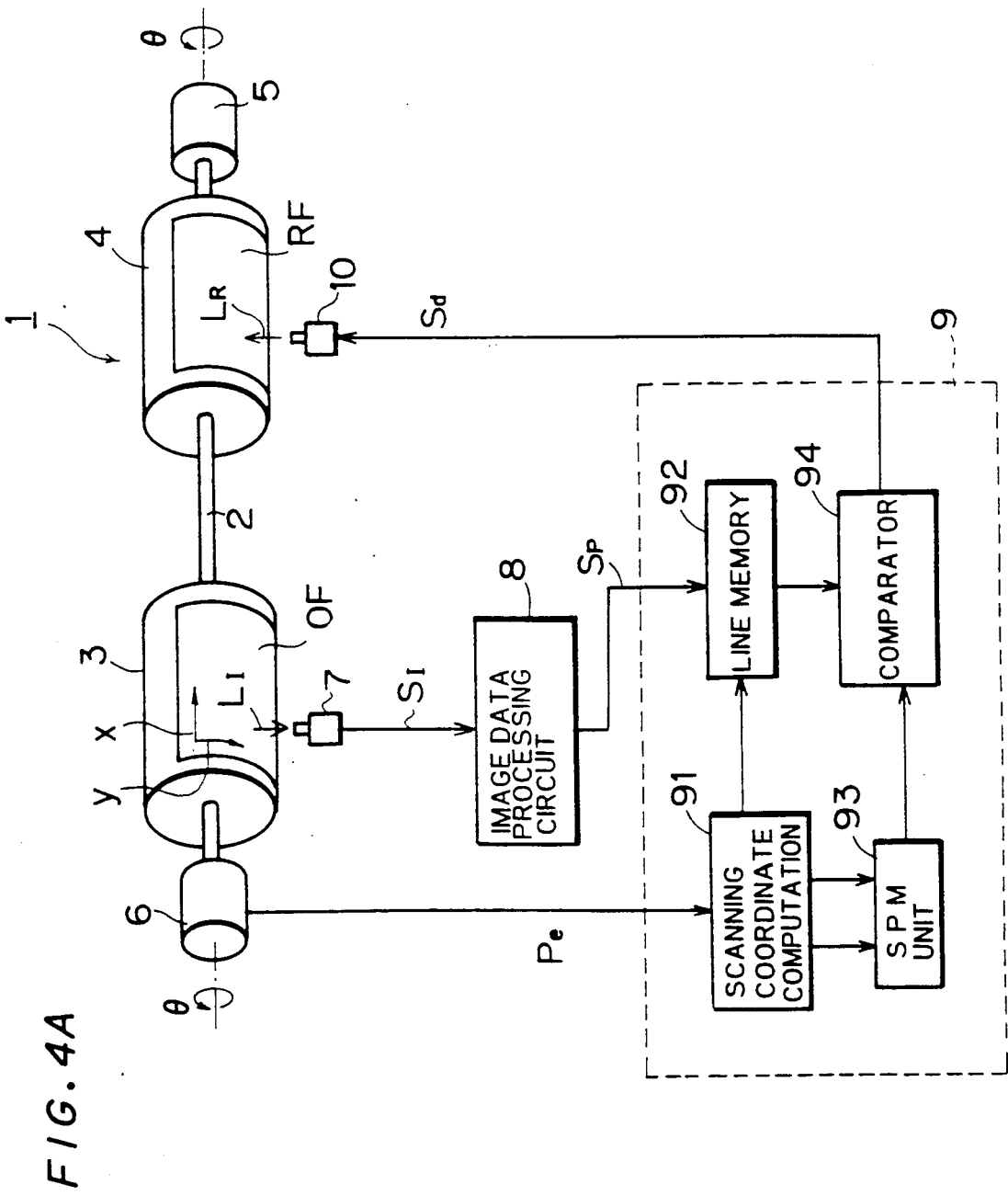

FIG. 4A is a block diagram showing the structure of a color scanner according to a preferred embodiment of the present invention. The color scanner 1 comprises a reading drum 3 and a recording drum 4 which are connected to each other by a common shaft 2. An original film OF is wound around the reading drum 3, and a photosensitive film RF is wound around the recording drum 4. The shaft 2 is provided with a motor 5 at one end and a rotary encoder 6 at the other end.

When the color scanner 1 reads the original OF and records images on the recording film RF, the motor 5 rotates the shaft 2, the reading drum 3 and the recording drum 4 in a direction $\theta$ at a constant speed. A light source (not shown) such as a halogen lamp provided inside the reading drum 3 emits light $L_I$, and the light $L_I$ having passed through the transparent reading drum 3 and the original OF is read by a pick-up head 7.

The pick-up head 7 moves in a subscanning direction $\underline{x}$ at a relatively slow speed. Therefore, the original OF is read in a main scanning direction $\underline{y}$ with respect to each scanning line in order. The main scanning direction $\underline{y}$ corresponds to the circumferential direction of the reading drum 3. The pick-up head 7 performs color separation operation to generate color separation signal $S_I$ having red (R), green (G) and blue (B) components. The color separation signal $S_I$ is supplied to an image data processing circuit 8. The image data processing circuit 8 performs the color correction and converts the color separation signal $S_I$ into density signals $S_p$ ($S_{py}$, $S_{pm}$, $S_{pc}$ and $S_{pk}$) for the yellow (Y), magenta (M), cyan (C) and black (B) printers, respectively. The density signals $S_p$ are supplied to a halftone signal conversion circuit 9 and converted therein into a dot signal $S_d$. The dot signal $S_d$ represents small dot (or halftone dots) on the recording film RF. The dot signal $S_d$ is supplied to a recording head 10, which exposes the recording film RF with a laser beam $L_R$ according to the dot signal $S_d$ to record halftone images.

Figure 5:
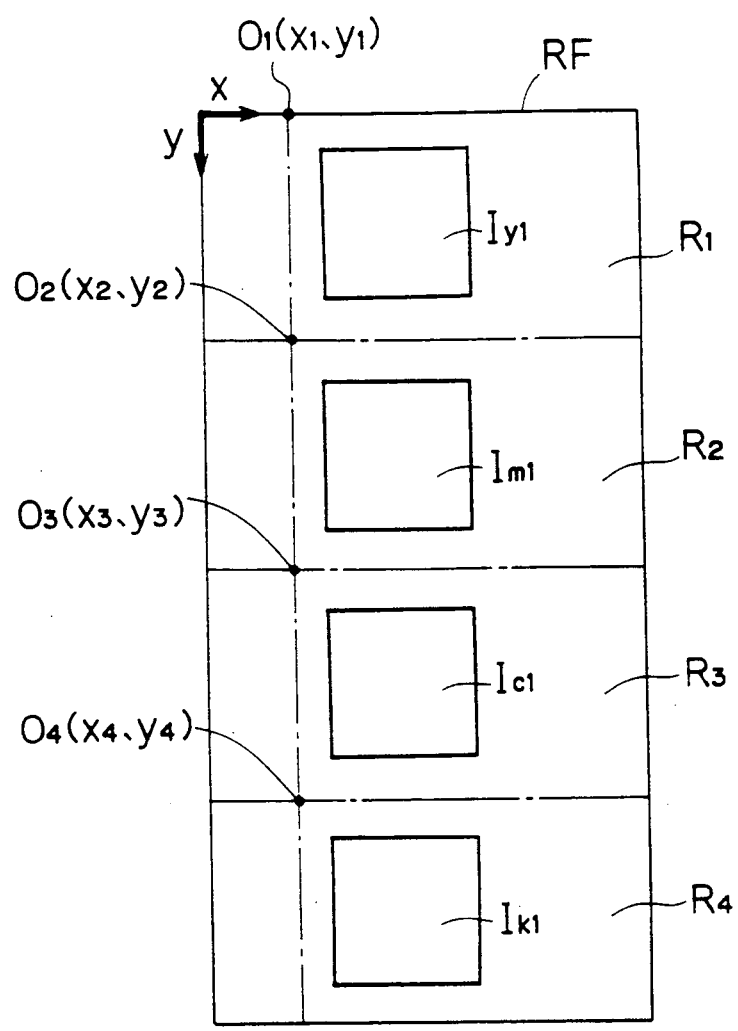
FIG. 5 is a diagram schematically showing halftone images recorded on a photosensitive film.

FIG. 5 is a diagram schematically showing halftone images recorded on the recording film RF. Halftone images $I_{y1}$, $I_{m1}$, $I_{c1}$ and $I_{k1}$ for Y, M, C and K color components are respectively recorded on the single recording film RF. The arrangement of the halftone images can be arbitrarily changed.

The halftone signal conversion circuit 9, shown in FIG. 4B generates the dot signal $S_d$ with which the halftone images $I_{y1}$, $I_{m1}$, $I_{c1}$ and $I_{k1}$ are recorded on the single recoring film RF. The halftone conversion circuit 9 comprises a scanning coordinate computation circuit 91, a line memory 92, a screen pattern data memory unit (or SPM unit) 93 and a comparator 94. The scanning coordinate computation circuit 91 and the SPM unit 93 as a whole function as means for generating halftone-dot pattern data for every pixel in synchronism with the density signals $S_p$. The comparator 94 functions as means for generating the dot signal $S_d$ representing halftone dots to be recorded.

FIG. 4B is a block diagram showing the internal structure of the halftone signal conversion circuit 9.

The line memory 92 has capacity to store the values of the density signals $S_p$ ($S_{py}$, $S_{pm}$, $S_{pc}$ and $S_{pk}$) for one main scanning line with respect to each pixel in order of the scanning. The line memory 92 is divided into four memory portions corresponding to respective areas $R_1$ to $R_4$ shown in FIG. 5. The values of the Y, M, C and K components of the density signals $S_p$ are stored in the corresponding memory portions in the line memory 92.

The scanning coordinate computation circuit 91 computes scanning coordinate on the reading drum 3 and the recording drum 4 according to a pulse signal $P_e$ supplied from the rotary encoder 6. The pulse signal $P_e$ is generated by the rotary encoder 6 for every unit angle of rotation of the shaft 2. The pulse signal $P_e$ is supplied to a coordinate computation unit 911 and converted therein into a main scanning coordinate $y$ and a subscanning coordinate $x$ of the pick-up head 7 on the reading drum 3. During reading and recording operation, the reading and recording drums 3 and 4 rotates in the direction $\theta$ at a constant speed and the pick-up head 7 moves in the direction $x$ at another constant speed. Therefore, both of the main scanning coordinate $y$ and the subscanning coordinate $x$ of the pick-up head 7 (or those of a reading position) are computed by counting up the number of pulses of the pulse signal $P_e$ while a prescribed reference position on the reading drum is assumed as an origin. In this embodiment, the recording head 10 moves in the direction $x$ at the same speed as the pick-up head 7. Therefore, the coordinates of recording position are the same as the coordinates (x, y) of the reading position.

The coordinate data (x, y) are supplied from the coordinate computation unit 911 to an address converter 912 and converted therein into an address (i, j) to be supplied to the SPM unit 93.

The SPM unit 93 comprises four screen pattern memories (or SPM's) $931_y$, $931_m$, $931_c$ and $931_k$ and a data selector 932. The SPM's $931_y$, $931_m$, $931_c$ and $931_k$ store respective screen pattern data $D_y$, $D_m$, $D_c$ and $D_k$. The data selector 932 selects one of the SPM's to connect the same with the comparator 94 in response to a selection signal $S_s$.

The selection signal $S_s$ is produced in a component selection circuit 915 provided in the scanning coordinate computation circuit 91 on the basis of the main scanning coordinate $y$ and coordinate data $y_1$ to $y_4$ for respective halftone images. The main scanning coordinate $y$ is supplied from a main-scanning coordinate computation unit 913 which generates the coordinate $y$ according to the pulse signal $P_e$ supplied from the rotary encoder 6. The coordinate data $y_1$ to $y_4$ are supplied from a coordinate data memory 914.

The coordinate data memory 914 memorizes the co-ordinate data $y_1$ to $y_4$ representing the main scanning coordinates of the reference points $O_1$ through $O_4$ of respective areas $R_1$ through $R_4$. These data $y_1$ to $y_4$ are fixed in advance by an operator in consideration of recording condition. The component selection circuit 915 judges which one of the area $R_1$, $R_2$, $R_3$ and $R_4$ the recording position on the recording drum 4 exists in. The judgement is made on the basis of the coordinate data $y_1$ to $y_4$ and the main scanning coordinate $y$ computed by the coordinate computation unit 913. The component selection circuit 915 generates the selection signal $S_s$ and supplies the same to the data selector 932. The data selector 932 selects one of the SPM's $931_y$, $931_m$, $931_c$ and $931_k$ in response to the selection signal $S_s$.

One of the screen pattern data $D_y$, $D_m$, $D_c$ and $D_k$ is supplied to the comparator 94 through the data selector 932 in accordance with the coordinates of the recording position. The comparator 94 also receives one of the density signals $S_p$ ($S_{py}$, $S_{pm}$, $S_{pc}$ and $S_{pk}$) from the line memory 92 in accordance with the coordinates of the recording position. The comparator 94 generates the dot signal $S_d$ indicating whether each recording pixel (or a pixel at the recording position) is to be exposed or not, according to the comparison of the values of the density signal $S_p$ and the screen pattern data. The dot signal $S_d$ is supplied to the recording head 10, which exposes respective halftone images $I_{y1}$, $I_{m1}$, $I_{c1}$ and $I_{k1}$ on the recording film RF.

Printing plates for respective four color printers are produced with the recording film $R_F$. Finally, a reproduced color image which has the positional relations among respective halftone images as shown in FIG. 1E can be produced with those printing plates.

Now, the contents of the screen pattern data $D_y$ through $D_k$, which correspond to the halftone images of FIGS. 1A through 1D, respectively, will be described.

Figure 6A:
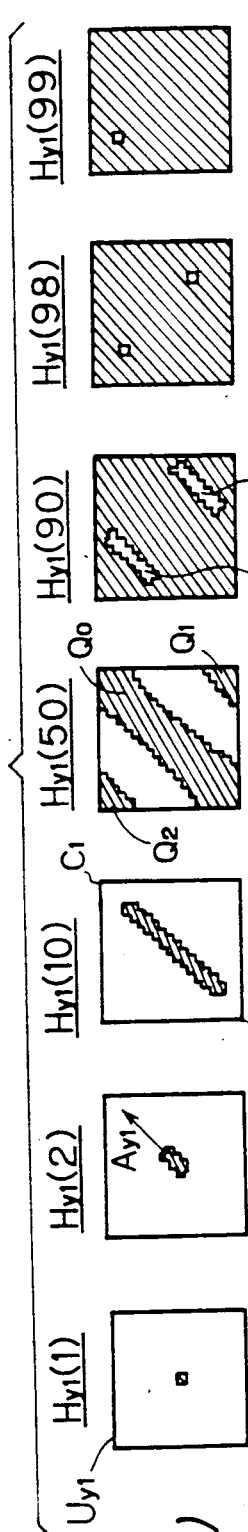
Figure 6A:
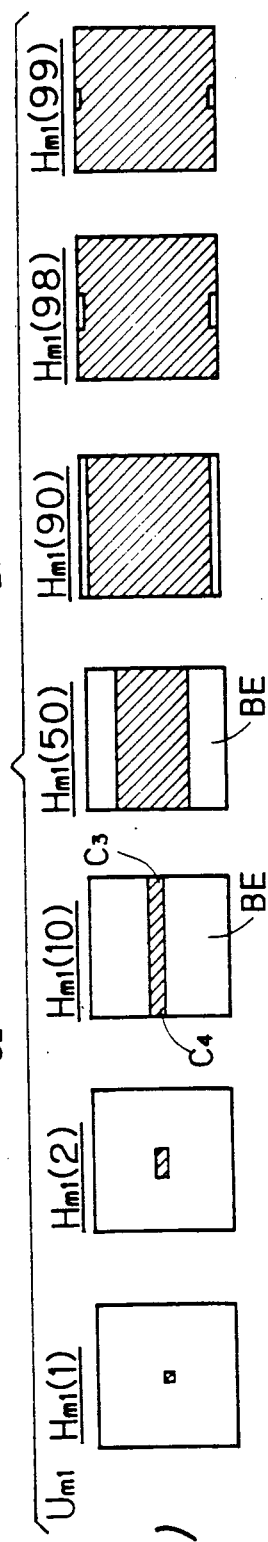
Figure 6A:
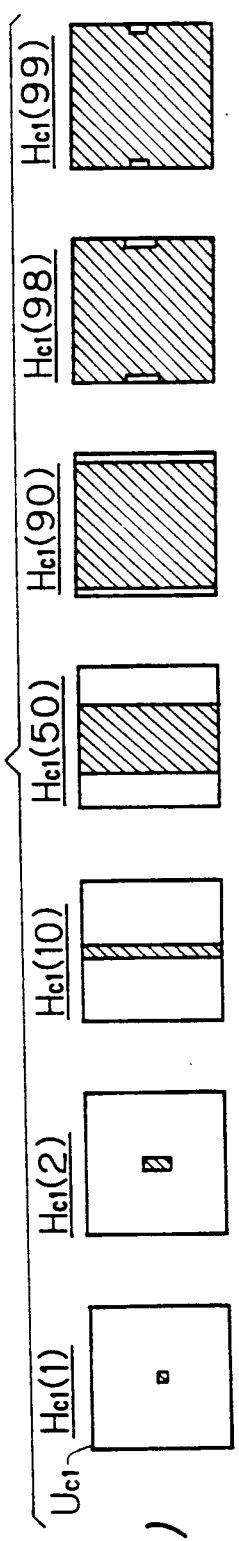
Figure 6A:
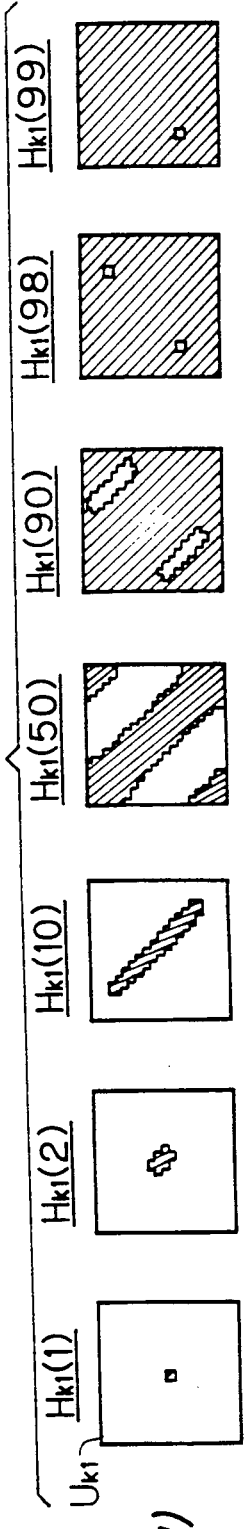

The screen pattern data $D_y$ through $D_k$ are consistent with the various shapes of respective halftone dots at every value of the halftone-dot area rate. FIG. 6A illustrates the shapes of the halftone dots $H_{y1}$, $H_{m1}$, $H_{c1}$ and $H_{k1}$ shown in FIGS. 1A through 1D at several values of the halftone-dot area rate. The shapes of the halftone dots $H_{y1}$, $H_{m1}$, $H_{c1}$ and $H_{k1}$ are arrayed at rows (a) through (d) of FIG. 6A, respectively. The halftone-dot area rate is varied from 1 percent at the left hand side to 99 percent at the right hand side. A symbol $H_{y1}(r)$, where $r$ is from one to ninety nine, denotes a halftone dot $H_{y1}$ at the halftone-dot area rate of $r$ percent. In FIG. 6A, areas to be recorded as halftone dots, or halftone dot elements, are shaded. The square frames of the halftone dots correspond to the 100%-halftone-dot shape $U_{y1}$, $U_{m1}$, $U_{c1}$ and $U_{k1}$.

Although the halftone dot $H_{y1}(r)$ at the halftone-dot area rate of one percent seems like a small point, it grows in the extensional direction $A_{y1}$ as the halftone-dot area rate $r$ increases. At the halftone-dot area rate $r$ of about 15 percent, the halftone dot reaches corner points $C_1$ and $C_2$ of the 100%-halftone-dot shape $U_{y1}$. Consequently, the halftone dots $H_{y1}$ are connected with adjacent halftone dots $H_{y1}$ in the extensional direction $A_{y1}$, thereby forming a pattern of parallel lines. As the halftone-dot area rate increases over about 15 percent, the width of the parallel lines increases.

The halftone dot $H_{y1}(50)$ consists of a central element $Q_O$ and two diagonal elements $Q_1$ and $Q_2$. The diagonal elements $Q_1$ and $Q_2$ are formed so that the halftone dots neighboring in the extensional direction $A_{y1}$ form a smooth line, as shown in FIG. 7. FIG. 7 illustrates $3 \times 3$ matrix of the halftone dots $H_{y1}(50)$. As can be seen in FIG. 7, two central elements $Q_{01}$ and $Q_{02}$ neighboring in the extensional direction $A_{y1}$ and two diagonal elements $Q_{22}$ and $Q_{31}$ as a whole form a smooth line. The diagonal elements $Q_{22}$ and $Q_{31}$ are ones in the halftone dot neighboring the central halftone dot in the main scanning direction $\underline{y}$ and the subscanning direction $\underline{x}$, respectively. Consequently, a plurality of parallel lines are drawn through the centers of the halftone dots in the extensional direction $A_{y1}$. Incidentally, borders between the areas to be exposed and the areas not to be exposed are actually formed stepwise because the halftone dot $H_{y1}(r)$ is composed of square pixels as will be described later. However, the borders are simply drawn with straight lines except the central halftone dot in FIG. 7.

The halftone dots $H_{k1}(r)$ for the black printer shown in FIG. 6A have the shapes which are rotated at 90 degrees from those of the halftone dots $H_{y1}(r)$ for the yellow printer.

The halftone dot $H_{m1}(r)$ for the magenta printer, which is shown in the row (b) of FIG. 6A, reaches two central points $C_3$ and $C_4$ of facing sides of a square representing the 100%-halftone-dot shape $U_{m1}$ at the halftone-dot area rate of about 10 percent. The width of the linear halftone dot $H_{m1}(r)$ increases as the halftone-dot area rate increases thereon.

The halftone dots $H_{c1}(r)$ for the cyan printer have the shapes which are rotated at 90 degrees from those of the halftone dots $H_{m1}(r)$ for the magenta printer.

Figure 8A:
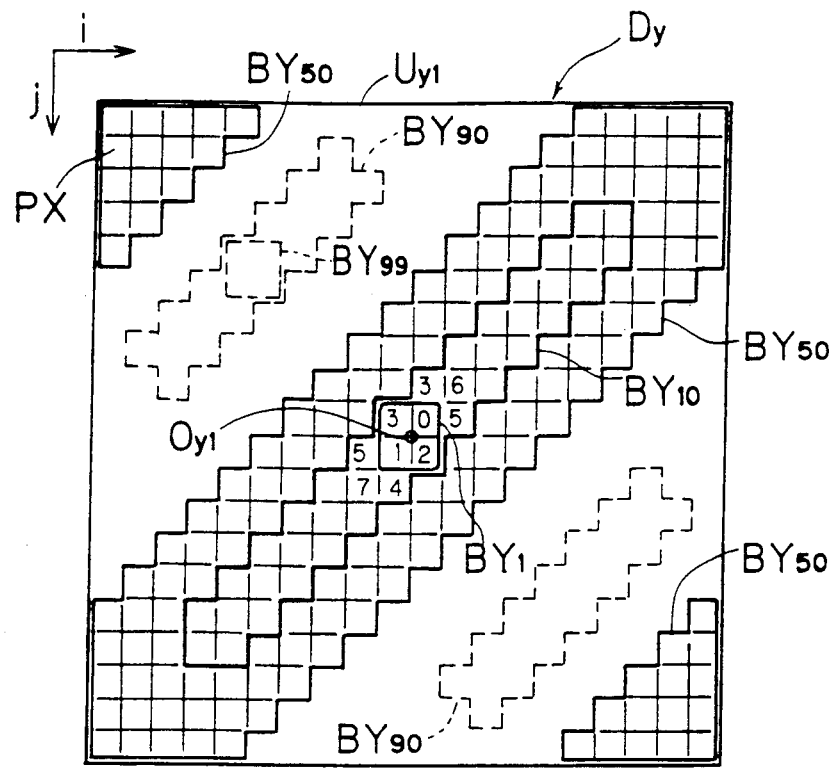
FIGS. 8A and 8B illustrate the contents of screen pattern data in the first preferred embodiment.
Figure 8B:
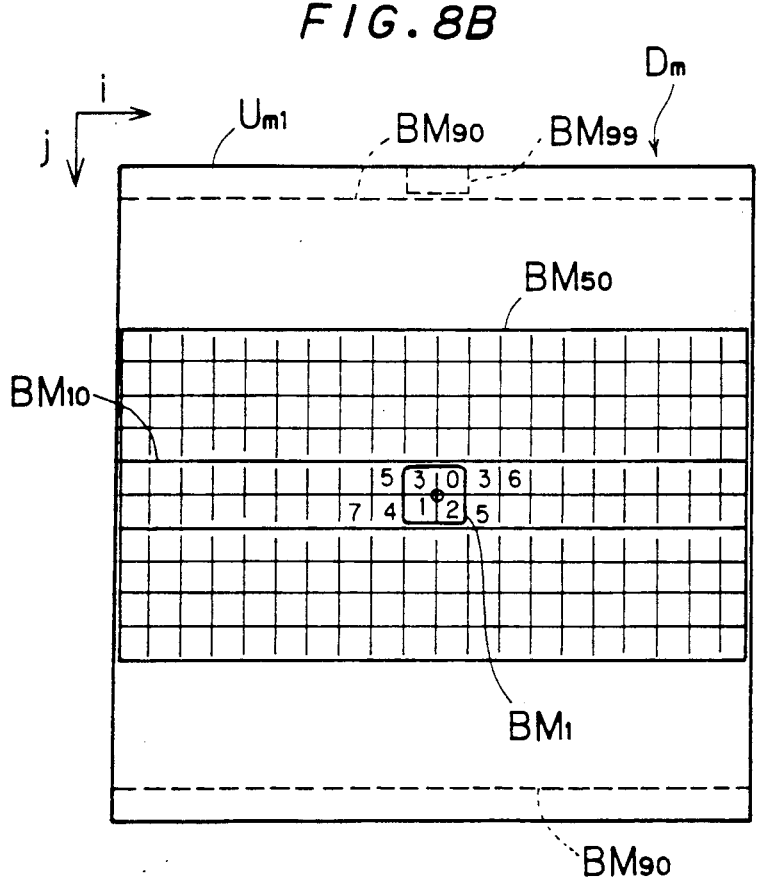

FIGS. 8A and 8B illustrate the contents of the screen pattern data. The screen pattern data $D_y$ shown in FIG. 8A are used in forming the halftone dot $H_{y1}(r)$ shown in FIG. 6A. An address (i, j) of the screen pattern data $D_y$ is related to one pixel PX. Therefore, the screen pattern data $D_y$ consist of digital threshold values allocated to each pixel PX. FIG. 8A exemplarily shows the threshold values of 0, 1, 2 ..., which become bigger from the halftone-dot center $O_{y1}$ to the periphery. These digital threshold values are supplied to the comparator 94 with respect to each pixel, as described before, to be compared therein with the value of the density signal $S_p$. When the value of the density signal $S_p$ is greater than the screen pattern data, the comparator 94 generates the dot signal $S_d$ representing the corresponding pixel to be exposed. Accordingly, the greater the value of the density signal $S_p$ becomes, the greater the area of the halftone dot becomes. FIG. 8A illustrates lines $BY_1$, $BY_{10}$, $BY_{50}$, $BY_{90}$ and $BY_{99}$ which form contours of the shapes of the halftone dots at the halftone-dot area rates of 1%, 10%, 50%, 90% and 99%, respectively. The area inside the solid contour lines $BY_1$, $BY_{10}$ and $BY_{50}$ are to be exposed at respective halftone-dot area rates. On the other hand, the areas inside the broken contour lines $BY_{90}$ and $BY_{99}$ are not to be exposed at respective area rates while the outside areas are to be exposed.

FIG. 8B illustrates the content of the screen pattern data $D_m$ for the halftone dots $H_{m1}(r)$ shown in FIG. 6A. Contour lines $BM_1$ through $BM_{99}$ in FIG. 8B correspond to the contour lines $BY_1$ through $BY_{99}$ in FIG. 8A.

Incidentally, in FIGS. 8A and 8B, borders between pixels are omitted in the areas which are not exposed at the halftone area rate of 50 percent, for convenience of illustration.

The screen pattern data $D_c$ for the cyan printer are obtained by rotating the configuration of the screen pattern data $D_m$ for the magenta printer shown in FIG. 8B. The screen pattern data $D_k$ for the black printer are obtained by rotating the configuration of the screen pattern data $D_y$ for the yellow printer shown in FIG. 8A.

According to the conventional technique, the screen pattern data are required to cover a large area including several halftone dots because the halftone images have respective screen angles different from each other, such as 15°, 45° and 75°. On the other hand, according to the present invention, the screen pattern data for the area corresponding to a 100%-halftone-dot shape, as shown in FIGS. 8A and 8B, are enough to form halftone dots all over a halftone image while adjusting the address (i, j) according to the coordinates of the recording pixel (or the pixel at the recording position).

FIG. 6B illustrates modified shapes of the halftone dots $H_{y1}(r)$ and $H_{k1}(r)$ at the halftone-dot area rate of over 90 percent. The halftone dot $H_{y1}(90)$ shown in FIG. 6A includes two blank areas, which are not to be exposed, formed separately and independently. On the other hand, a halftone dot $H_{y1a}(90)$ shown in FIG. 6B includes two blank areas $B_3$ and $B_4$ each of which is connected with a blank area of the neighboring halftone dot. This is also the case with halftone dots $H_{y1a}(98)$ and $H_{y1a}(99)$. By using the halftone dots shown in FIG. 6B, the number of separated blank areas in an image becomes one-half of that in an image produced with the halftone dots shown in FIG. 6A at the halftone-dot area rate of more than about 85 percent. Therefore, the size of the separated blank areas is doubled, and it makes easier to form the blank areas with desired size on a printed paper.

Figure 9A:
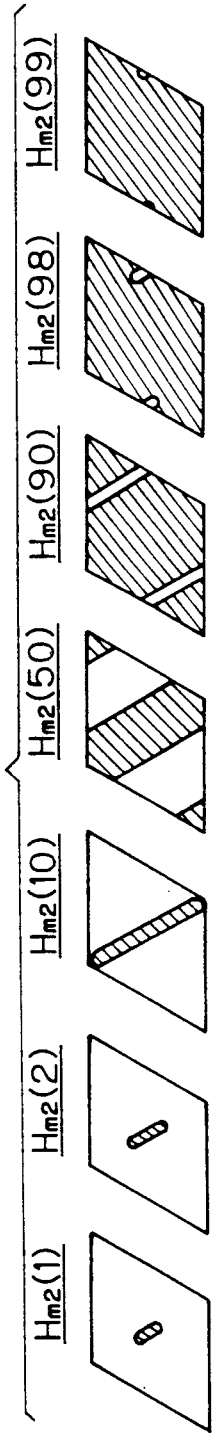
Figure 9B:
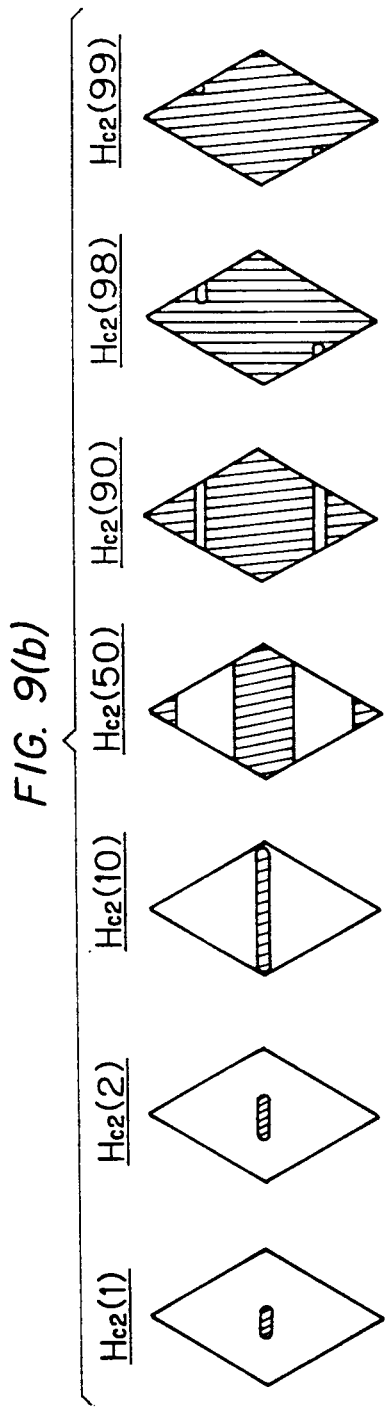
Figure 9C:
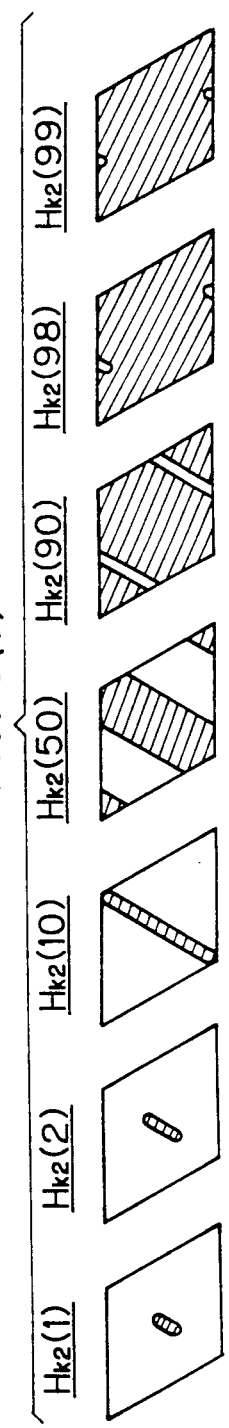

FIG. 9 illustrates shapes of halftone dots $H_{m2}(r)$, $H_{c2}(r)$ and $H_{k2}(r)$ for the halftone images shown in FIGS. 4A through 4C, respectively. The screen pattern data for these halftone dots are prepared in the same manner as those shown in FIG. 8, and are omitted here.

Figure 10:
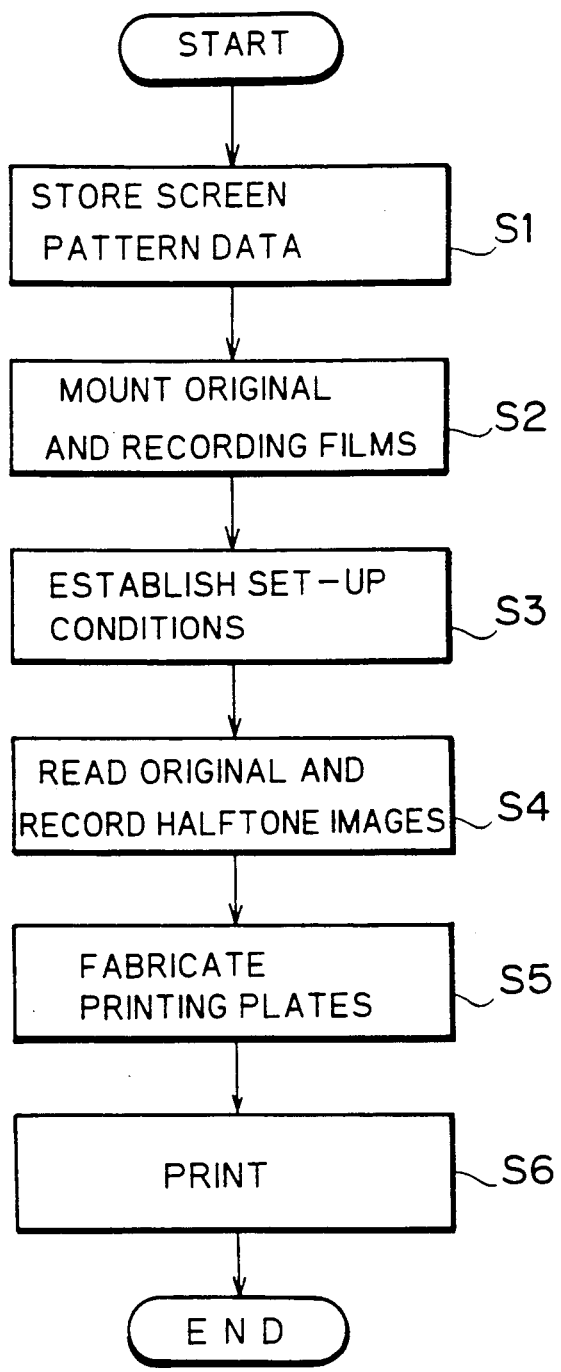
FIG. 10 is a flow chart showing the procedure for recording halftone images according to the first preferred embodiment.

FIG. 10 is a flow chart showing the procedure for recording halftone images according to the preferred embodiment of the present invention.

At a step S1, the screen pattern data $D_y$ through $D_k$ are stored in the SPM's $931_y$ through $931_k$, respectively. Instead, an operator may select one of plural sets of the screen pattern data $D_y$ through $D_k$ which correspond to the halftone dots shown in FIGS. 1A through 1D, 2A through 2C and the like, and which are stored in advance.

At a step S2, an original OF and a recording film RF are mounted on the reading drum 3 and the recording drum 4, respectively.

At a step S3, the operator designates so-called set-up conditions for color correction and the like in the image data processing circuit 8 with a key board (not shown) or the like.

At a step S4, the original OF is scanned to be read and halftone images are recorded on the recording film RF while the reading drum 3 and the recording drum 4 are rotating.

With the halftone images thus produced, printing plates for respective color inks are fabricated at a step S5.

At a step S6, a color reproduced image is produced by overprinting the halftone images with the printing plates.

Registering mismatch at the step S6 may cause to produce the image such as that shown in FIG. 1H where all of the halftone-dot centers are not placed at a same position. However, even in this case, the size of the unit area to be repeated is maintained almost same as that of a 100%-halftone-dot shape because the registering mismatch only cause parallel movement among the halftone images. Therefore, the registering mismatch does not cause the rosette moire. The registering mismatch also changes the shapes of the areas where the halftone dots are overlapping each other. However, since the ares-to-be-exposed of respective halftone dots extend at respective extensional directions, the size of the ovelapping areas does not change so much because òf the registering mismatch. Thus the color shift is prevented.

The following modifications to the shapes of the halftone dots will improve the quality of printed matter.

FIGS. 11A and 11B illustrate characteristic curves of dot gain for the conventional halftone dot and the halftone dot $H_{m1}(r)$ shown in FIG. 6A, respectively. The dot gain G(%) is defined by the following expression:

$$G = [\text{Halftone-dot area rate on printed matter (\%)}] - \quad (10)$$
$$[\text{Halftone-dot area rate on halftone film (\%)}]$$

where the halftone film denotes the recording film on which the halftone images are recorded.

Printed matter is generally produced with printing plates which are fabricated by reproducing halftone images thereon. Halftone-dot area rate on the printed matter thus obtained is usually higher than that on the halftone film. This is because ink on the printing plate is pressed on a printing paper and spreading thereon.

The dot gain $G_1$ for the conventional square halftone dot shown in FIG. 11A, is indicated with a smooth curve culminating at about the middle of the halftone-dot area rate. In general, the dot gain depends on the length of a boundary between an area to be exposed and an area not to be exposed. The boundary of the conventional square halftone dot is longest at the halftone-dot area rate of 50 percent. Therefore, the dot gain $G_1$ is largest at the halftone-dot area rate of about 50 percent in FIG. 11A.

The dot gain $G_2$ shown in FIG. 11B also depends on the boundary length of the halftone dot $H_{m1}(r)$ shown in FIG. 6A. Since the shape of the halftone dot $H_{m1}(r)$ varies in its extensional direction at the halftone-dot area rate of 10 percent or less while its width is maintained, the boundary length is nearly proportional to the halftone-dot area rate r. Accordingly, the dot gain $G_2$ increases lineally at the halftone-dot area rate up to 10 percent. As the halftone-dot area rate increases to more than 10 percent, a blank area BE, which are shown in the halftone dots $H_{m1}(10)$ and $H_{m1}(50)$ in FIG. 6A, gets thinner while its boundary length is maintained. Consequently, the dot gain $G_2$ shown in FIG. 11B is almost constant at he halftone-dot area rate of 10 percent or more. At the halftone-dot area rate of 70% or more, the dot gain $G_2$ rapidly increases. This is because the width of the blank area BE becomes quite small at that range of the halftone-dot area rate and a part of the blank area BE is smeared with ink. Finally, at the halftone-dot area rate of about 83 percent, the printed matter becomes solid all over. A dash-dotted line SL shown in FIG. 11B is a line on which the summation of the halftone-dot area rate and the dot gain is 100 percent. At the intersection of the dash-dotted line SL and the characteristic curve of the dot gain $G_2$, the blank area which is formed on a halftone film is smeared all over with ink on printed matter because of the effect of the dot gain. When the printed matter becomes solid in spite of the blank area on the halftone film, a so-called tone-jump phenomenon, which means color tone of the printed matter change suddenly, occurs. Since tone-jump phenomenon is not good for the continuity of its tone reproduction of the printed matter, it is desirable that the tone-jump phenomenon is prevented by modifying the shape of the halftone dot.

There is another point in the characteristic curve of the dot gain $G_2$ to be improved at comparatively low range of the halftone-dot area rate. At the range of the halftone-dot area rate from a few percent to 20 percent, the dot gain $G_2$ shown in FIG. 11B is much larger than the dot gain $G_1$ shown in FIG. 11A. If the dot gain is fairly large at the comparatively low range of the halftone-dot area rate, it is difficult to reproduce small halftone dots on the printed matter. Therefore, the characteristic curve of the dot gain $G_2$ shown in FIG. 11B is not good for the tone reproducibility at the comparatively low range of the halftone-dot area rate.

It is further considered that if the width of the area-to-be-exposed in a halftone dot, or the width of the blank area, is too thin, the dot gain becomes unstable and therefore the tone reproduction is hard to be stabilized.

The modification to the shapes of the halftone dots is performed in consideration of the above described items. FIG. 12 illustrates modified shapes of the halftone dots. Rows (a-1) and (a-2) of FIG. 12 show a halftone dot $H_{y1b}(r)$, where r is varied from one to ninety nine percent, obtained by modifying the halftone dot $H_{y1}(r)$ shown at the row (a) of FIG. 6A. Rows (b-1) and (b-2) of FIG. 12 show a halftone dot $H_{m1b}(r)$ obtained by modifying the halftone dot $H_{m1}(r)$ shown at the row (b) of FIG. 6A. In FIG. 12, the halftone dots for the cyan and black printers are omitted, but they can be obtained by rotating the halftone dots $H_{y1b}(r)$ and $H_{m1b}(r)$ at 90 degrees, respectively.

Figure 13A:
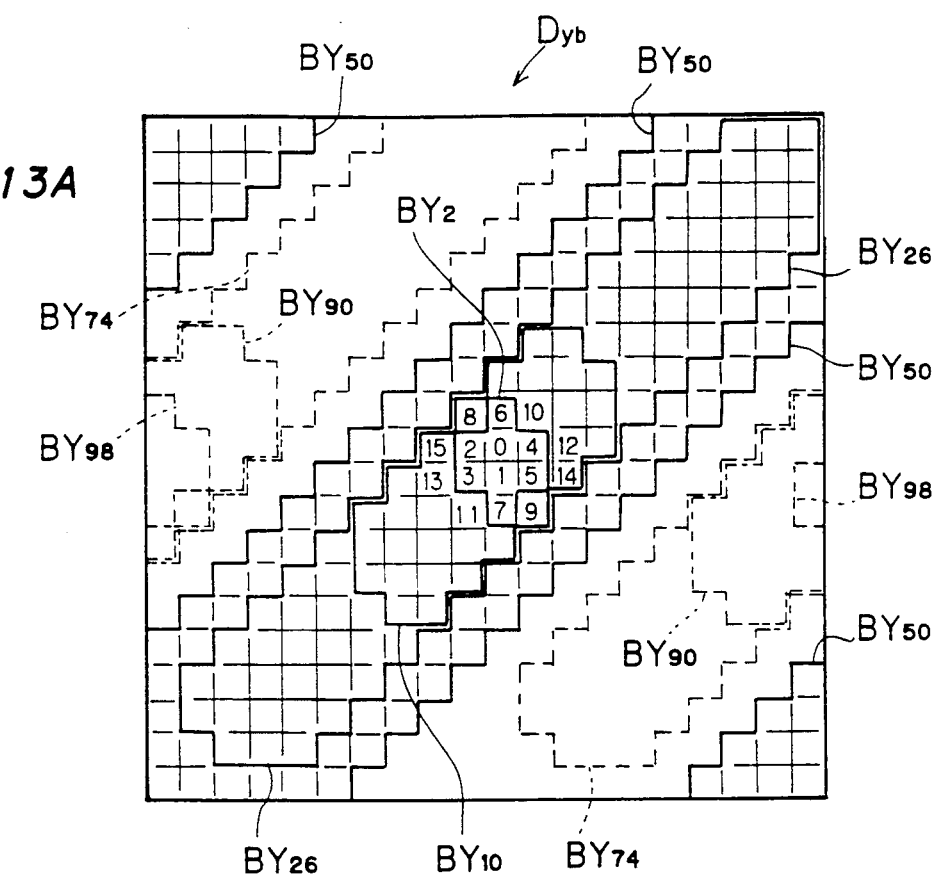
FIGS. 13A and 13B illustrate the contents of screen pattern data corresponding to the halftone dots shown in FIG. 12.
Figure 13B:
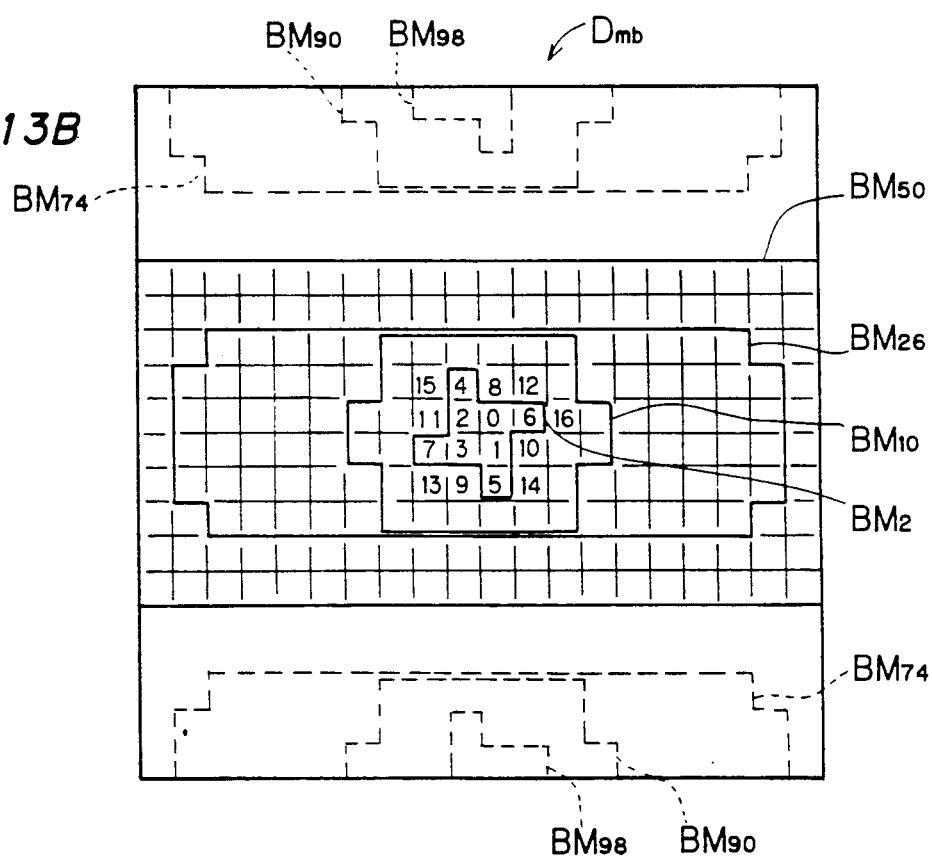

FIGS. 13A and 13B illustrate the contents of the screen pattern data corresponding to the halftone dots $H_{y1b}(r)$ and $H_{m1b}(R)$ shown in FIG. 12. In FIGS. 13A and 13B, contour lines $BY_2$–$BY_{98}$ and $BM_2$–$BM_{98}$ represent contours of the shapes of the halftone dots at respective halftone-dot area rates of 2–98 percent.

In the halftone dots $H_{y1b}(r)$ and $H_{m1b}(r)$, a halftone dot element HE which is to be exposed is connected with other halftone dot elements neighboring in the extensional direction at the halftone-dot area rate ranging from 26 percent to 74 percent, thereby forming parallel lines at regular intervals. The parallel lines are similar to those shown in FIG. 7. In other words, the halftone dots shown in FIG. 12 are almost the same as those shown in FIG. 6A at the halftone-dot area rate ranging from 26 percent to 74 percent.

Figure 14A:
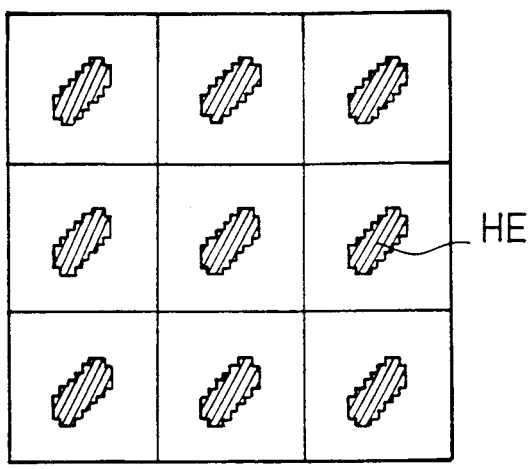
FIGS. 14A and 14B illustrate 3×3 matrixes of halftone dots with modified shapes in the first preferred embodiment.

At the range of the halftone-dot area rate of about 25 percent or less, the halftone dot elements HE have isolated shapes, as shown in FIG. 14A. On the other hand, the halftone dot elements in FIG. 6A are connected with neighboring halftone dot elements even at the halftone-dot area rate ranging from 10 percent to 25 percent. The width of the halftone dot element HE shown in FIG. 12 is larger than that of the halftone dot element shown in FIG. 6A at the halftone-dot area rate of about 25 percent or less. As described above, if the halftone dot elements have isolated shapes, each of halftone dot elements becomes thicker and the border length between the halftone dot elements and the blank elements becomes shorter. Consequently, the dot gain is reduced and stabilized.

Figure 14B:
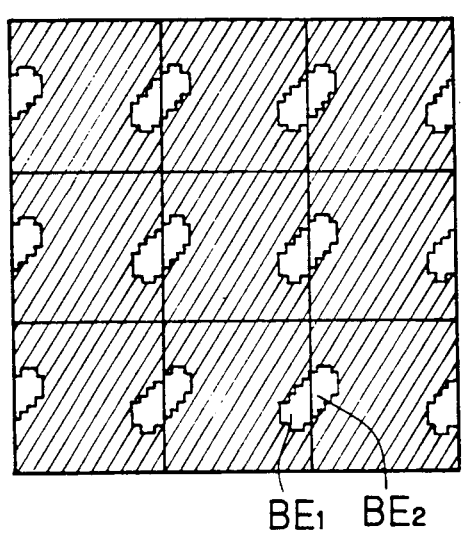

At the halftone-dot area rate of about 75 percent or more, the blank elements BE (or blank area) have isolated shapes as shown in FIG. 14B. In FIG. 14B, a blank element $BE_1$ in a halftone dot is connected with a blank element $BE_2$ in a neighboring halftone dot. However, a pair of the blank elements $BE_1$ and $BE_2$ have isolated shapes. The words "isolated shapes" include this type of halftone dot formation. If the blank elements are formed separately and insularly, each of the blank elements becomes thicker and the boundery length becomes shorter. Consequently, the dot gain is reduced and stabilized.

Figure 11C:
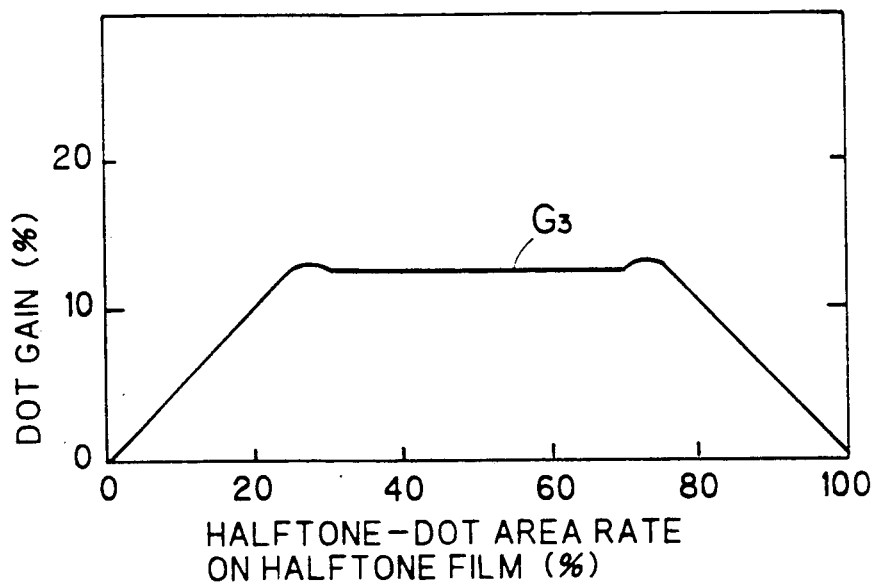

FIG. 11C illustrates a characteristic curve of dot gain for the halftone dot $H_{m1b}(r)$ shown in FIG. 12. The dot gain $G_3$ shown in FIG. 11C is smaller than the dot gain $G_2$ shown in FIG. 11B at the ranges of the halftone-dot area rate of about 25 percent or less and about 75 percent or more. In addition, the stability (or the reproducibility) of the dot gain value is improved at these ranges. (This is not shown in the figure.)

By modifying the shape of the halftone dot as shown in FIG. 12, the tone-jump phenomenon at comparatively high range of the halftone-dot area rate can be prevented as described above. Further, since the dot gain is reduced and stabilized at both of the comparatively high range and the comparatively low range of the halftone-dot area rate, the tone reproducibility is improved.

The dot gain as shown in FIG. 11B depends on the character of printing ink, the quality of a printing paper and the like. Therefore, the range of the halftone-dot area rate in which the halftone dot elements have isolated shapes can be wider than the range up to about 25 percent. For example, this range can be set to be up to about 30 percent, or, in some case, up to about 35 percent. Similarly, the range of the halftone-dot area rate in which the blank elements have isolated shapes can be set to be down to about 70 percent or down to about 65 percent.

The first preferred embodiment of the present invention described above achieves an object to prevent the rosette moire and the color shift as described above. A second preferred embodiment of the present invention described below has an object, in addition to that of the first preferred embodiment, to make substantial screen rulings of respective halftone images nearly equal to each other, to thereby make the reproducibility of respective halftone images in printing process nearly equal to each other.

Now, screen rulings of the halftone images shown in FIGS. 3A through 3C, which are produced in the first preferred embodiment, will be examined. The screen ruling is generally defined by the following expression:

[screen ruling] = [the number of halftone dots per inch] (11)

= [a reciprocal of a screen pitch (in inches)]

The first screen pitches $P1_{m3}$, $P1_{c3}$ and $P1_{k3}$ of the halftone images $I_{m3}$, $I_{c3}$ and $I_{k3}$ are equal to each other, as described before. The second screen pitches $P2_{m3}$, $P2_{c3}$ and $P2_{k3}$ are also equal to each other. Therefore, according to the above definition of the screen ruling, the screen rulings of the halftone images $I_{m3}$, $I_{c3}$ and $I_{k3}$ are equal to each other. Incidentally, as to a so-called single-lined screen well known in the art, whose halftone dots form parallel lines, the screen ruling can be defined to be the number of parallel lines per inch. Since the halftone dots of the halftone images $I_{m3}$, $I_{c3}$ and $I_{k3}$ also form parallel lines as shown in FIGS. 3A through 3C, respectively, substantial screen rulings for those halftone images can be defined in the same manner as the definition of the screen ruling of the single-lined screen as follows:

[substantial screen ruling] = [the number of parallel lines per inch] (12)

= [a reciprocal of an interval (in inches) of parallel lines]

As shown in FIG. 3D, the intervals $d_{m3}$, $d_{c3}$ and $d_{k3}$ of parallel lines in the respective halftone images $I_{m3}$, $I_{c3}$ and $I_{k3}$ are different from each other. More specifically, the intervals $d_{m3}$ and $d_{k3}$ are smaller than the interval $d_{c3}$ by about 40 percent. This means that the substantial screen rulings of the halftone images $I_{m3}$ and $I_{k3}$ are greater than that of the halftone images $I_{c3}$ by about 40 percent.

When the differences among the substantially screen rulings of the halftone images become larger than about 20 percent, the following problem may occur: As described in the first preferred embodiment, the dot gain depends on the length of the boundary between the solid area (or the area-to-be-exposed) and the blank area (or the area-not-to-be-exposed). Since the boundary length is almost proportional to the substantial screen ruling, the dot gain depends on the substantial screen ruling. Consequently, when the screen rulings of the halftone images are largely different from each other, the dot gain values of the halftone images are also largely different from each other. The large differences among the dot gain values of the halftone images means that the relation between the halftone-dot area rate of an image on the halftone film and that of an image on the printed matter for one halftone image is different from the relation for another halftone image; this reduces the reproducibility of the color tone of the printed matter because the color tone depends on the combination of the halftone-dot area rates of all the halftone images. Since the large differences among the dot gain values also means that the stabilities of the dot gain values are largely different among the halftone images, the stability of the color tone of the printed matter is also lowered. These problems concerning the reproducibility and the stability of the screen rulings are important when large screen rulings are used to produce a reproduced images of high quality.

In order to cope with the problems, the substantial screen rulings of the three halftone images which are closely related to the rosette moire are made nearly equal to each other in the second preferred embodiment of the present invention by the following technique: First, a minimum parallelogram which is made with the parallel lines of a first halftone image and those of a second halftone image intersecting each other is identified. Second, the extensional direction of halftone dots of a third halftone image is made agree with the direction of one of the two diagonals of the minimum parallelogram. This prevents the rosette moire and the color shift as described before in the first preferred embodiment. Further, the pitch of the parallel lines of the third halftone image is made equal to the length of the shorter diagonal out of the two diagonals of the minimum parallelogram, whereby the substantial screen rulings of the three halftone images are made close to each other. Since the pitch of the parallel lines of the third halftone dot is made equal to the length of the shorter diagonal, the extensional direction of halftone dots of the third halftone image is made agree with that of the longer diagonal of the parallelogram.

Figure 15A:
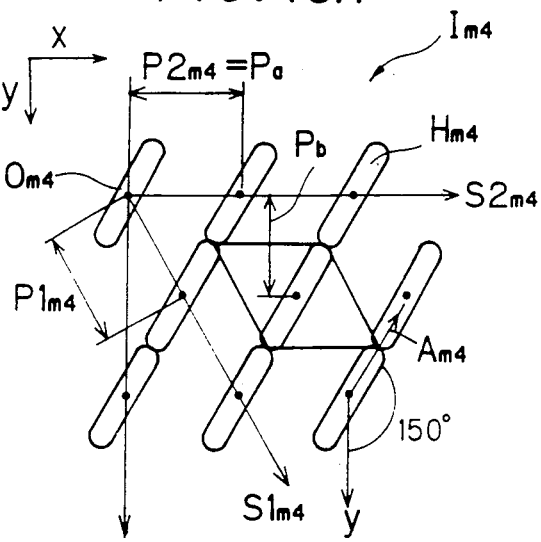
FIGS. 15A through 15H illustrate the configuration of halftone dots employed in a second preferred embodiment of the present invention.
Figure 15B:
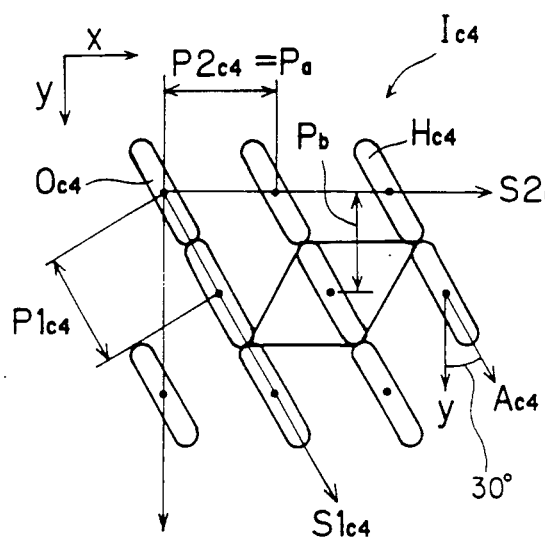
Figure 15C:
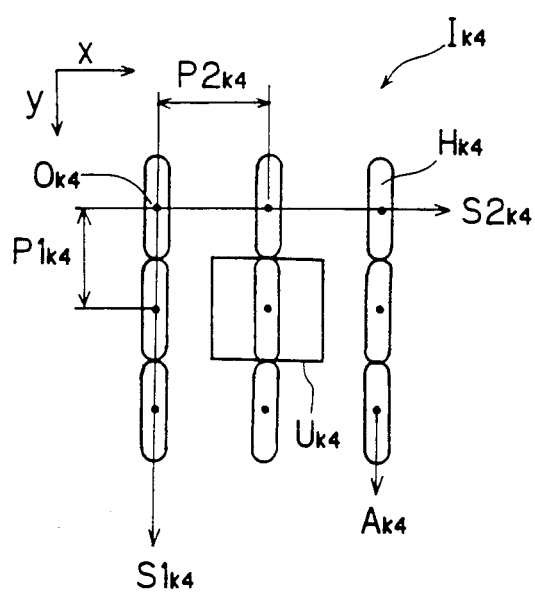

FIGS. 15A through 15H illustrate the configuration of halftone dots employed in the second preferred embodiment. FIGS. 15A through 15C show parts of respective halftone images $I_{m4}$, $I_{c4}$ and $I_{k4}$ for the magenta, cyan and black printers, corresponding to the halftone-dot area rate of about 20 percent. A halftone image for the yellow printer is omitted because it is loosely related to the rosette moire.

Halftone dots $H_{m4}$, $H_{c4}$ and $H_{k4}$ of the halftone images $I_{m4}$, $I_{c4}$ and $I_{k4}$, respectively, are formed in thin linear shapes extending in respective extensional directions $A_{m4}$, $A_{c4}$ and $A_{k4}$ different from each other. The halftone dots $H_{m4}$, $H_{c4}$ and $H_{k4}$ are connected with neighboring halftone dots in the respective extensional directions $A_{m4}$, $A_{c4}$ and $A_{k4}$, thereby forming parallel lines with regular intervals, respectively.

The angle between a first lattice axis $S1_{m4}$ and a second lattice axis $S2_{m4}$ of the first halftone images is different from that between a first lattice axis $S1_{k4}$ and a second lattice axis $S2_{k4}$ of the third halftone image, although those angles of the first and second halftone images are equal to each other. Therefore, it cannot be said that the three halftone images have a common screen angle.

The screen pitches of the three halftone images have the following relations:

$$P1_{m4} = P1_{c4} \neq P1_{k4} \quad (13)$$

$$P2_{m4} = P2_{c4} = P2_{k4} \quad (14)$$

That is, the second preferred embodiment does not necessarily satisfy the condition that the three halftone images have a common screen angle and a common screen pitch. However, in FIGS. 15A and 15B, two halftone images $I_{m4}$ and $I_{c4}$ have a common screen angle and a common screen pitch.

Figure 15D:
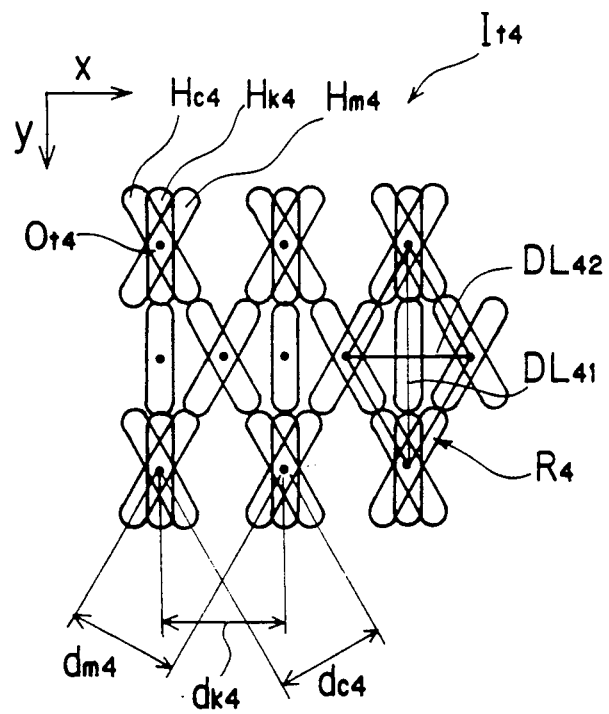

A reproduced image $I_{t4}$ shown in FIG. 15D is produced with these halftone images $I_{m4}$, $I_{c4}$ and $I_{k4}$. In the reproduced image $I_{t4}$, halftone dot centers $O_{m4}$, $O_{c4}$ an $O_{k4}$ of the halftone images $I_{m4}$, $I_{c4}$ and $I_{k4}$ are placed at a same position $O_{t4}$ on an image plane. FIG. 15D also illustrates a parallelogram $R_4$ which is formed with the parallel lines of the first and second halftone images $I_{m4}$ and $I_{c4}$. The direction of the longer diagonal $DL_{41}$ of the parallelogram $R_4$ agrees with the extensional direction of the halftone dot $H_{k4}$ of the third halftone image $I_{k4}$. In addition, the length of the shorter diagonal $DL_{42}$ of the parallelogram $R_4$ is equal to the pitch of the parallel lines in the third halftone image $I_{k4}$ measured in the direction of the shorter diagonal $DL_{42}$. In FIG. 15D, since the parallelogram $R_4$ is a rhombus, the two diagonals $DL_{41}$ and $DL_{42}$ intersect perpendicularly to each other and the pitch of the parallel lines in the direction of the diagonal $DL_{42}$ in the third halftone image is equal to an interval $d_{k4}$ of those parallel lines.

Figure 15E:
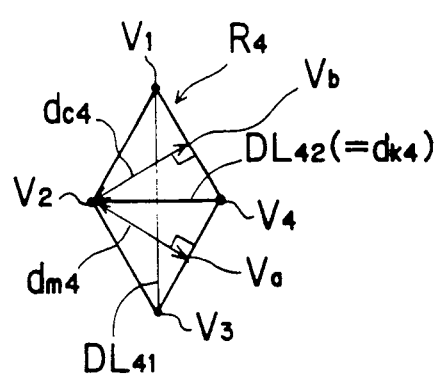

FIG. 15E illustrates the parallelogram $R_4$ having vertexes $V_1$ through $V_4$. An interval $d_{m4}$ of the parallel lines in the first halftone image $I_{m4}$ is equal to the length of a perpendicular dropped from the vertex $V_2$ to a side $\overline{V_3V_4}$. Similarly, an interval $d_{k4}$ of the parallel lines in the second halftone image is equal to the length of a perpendicular dropped from the vertex $V_2$ to a side $\overline{V_4V_1}$. A symbol $V_a$ denotes an intersection of the side $\overline{V_3V_4}$ and the perpendicular dropped from the vertex $V_2$ to the side $\overline{V_3V_4}$, and a symbol $V_b$ denotes an intersection of the side $\overline{V_4V_1}$ and the perpendicular dropped from the vertex $V_2$ to the side $\overline{V_4V_1}$. The right angled triangle $V_2V_aV_4$ has a hypotenuse $\overline{V_2V_4}$ ($=DL_{42}$), which is longer than a side $\overline{V_2V_a}$ ($=d_{m4}$). Similarly, the right angled triangle $V_2V_bV_4$ has a hypotenuse $\overline{V_2V_4}$ ($=DL_{42}$), which is longer than a side $\overline{V_2V_b}$ ($=d_{c4}$). Therefore, even if the length of the diagonal $DL_{42}$ is made equal to that of the interval $d_{k4}$ of the parallel lines of the third halftone image $I_{k4}$, the interval $d_{k4}$ is larger than the intervals $d_{m4}$, $d_{c4}$ of the parallel lines of the first and second halftone images. However, the interval $d_{k4}$ is made close to the intervals $d_{m4}$ and $d_{c4}$ by decreasing the angle $\angle V_2V_1V_4$ of the parallelogram $R_4$.

Specifically, in FIGS. 15A through 15E, the intervals $d_{m4}$, $d_{c4}$ and $d_{k4}$ have the following relations:

$$d_{m4} = d_{c4} \approx 0.87 \times P2_{m4} \quad (15)$$

$$d_{k4} = P2_{k4} = P2_{m4}$$

Since the maximum difference among the intervals $d_{m4}$, $d_{c4}$ and $d_{k4}$ is about 13 percent, the maximum difference among the substantial screen ruling of the halftone images is also about 13 percent. When the differences among the substantial screen rulings are less than about 20 percent, the stabilities of the color tone of the respective halftone images in printing process are close to each other. Consequently, the stabilities of the color tone of the halftone images $I_{m4}$, $I_{c4}$ and $I_{k4}$ in printing process is maintained close to each other.

Figure 15F:
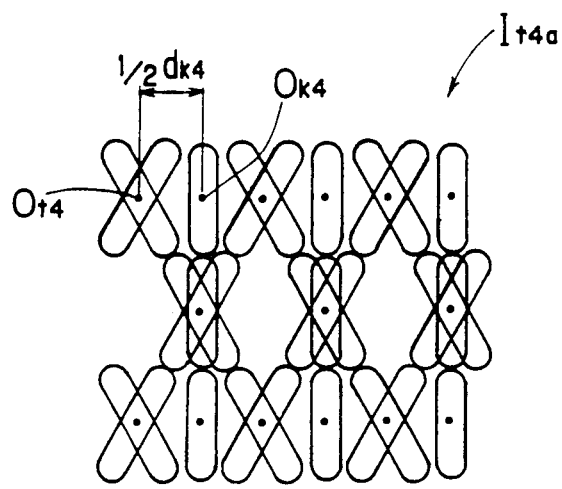

The fact that the pitch of the parallel lines of the third halftone image $I_{k3}$ is equal to the shorter diagonal $DL_{42}$ of the parallelogram $R_4$ has another effect on preventing the color shift. FIG. 15F illustrates a reproduced image $I_{t4a}$ where the halftone centers $O_{k4}$ are displaced by one half of the interval $d_{k4}$ in the direction x because of the registering mismatch in printing process. Even if the registering mismatch occurs as shown in FIG. 15F, the color shift is prevented because the pattern of the halftone dots is substantially the same as that of FIG. 15D. When the registering mismatch form a reproduced image which has the intermediate configuration of the halftone dots between those of FIGS. 15D and 15F, the ratios among a blank area of a printing paper, a one-colored area, a two-colored area and a three-colored area do not change so much that the color shift does not occur. Therefore, the color tone of the reproduced image is not affected by the registering mismatch.

Figure 15G:
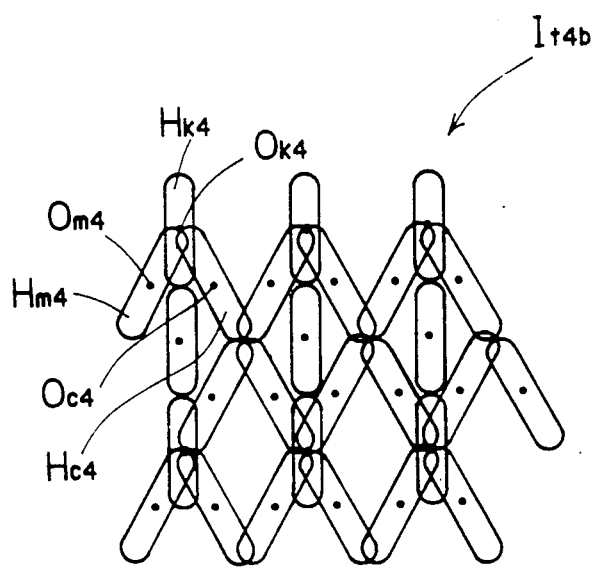
Figure 15H:
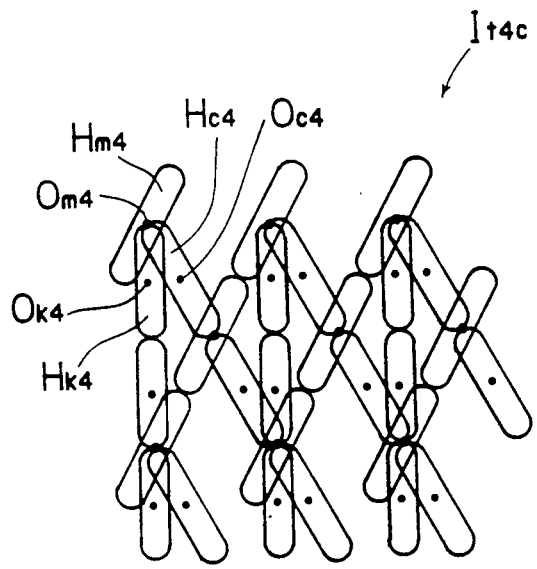
Figure 16B:
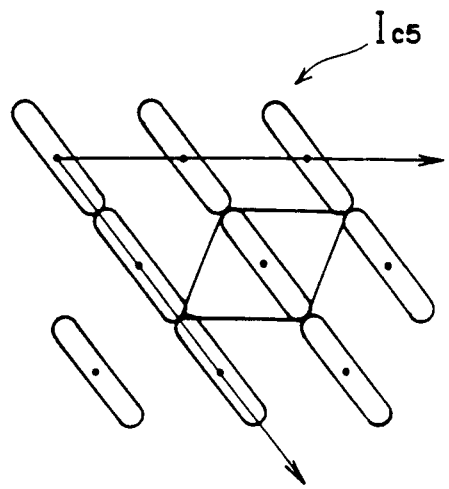
FIGS. 16A through 16D illustrate another configuration of halftone dots in the second preferred embodiment.
Figure 16A:
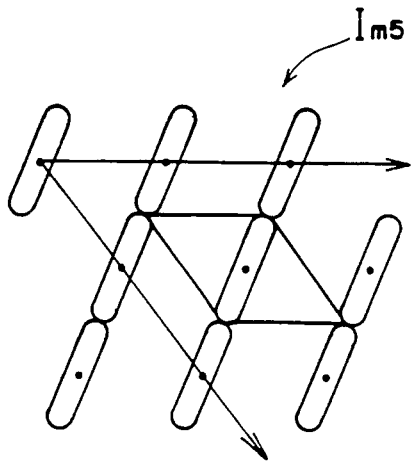
Figure 16D:
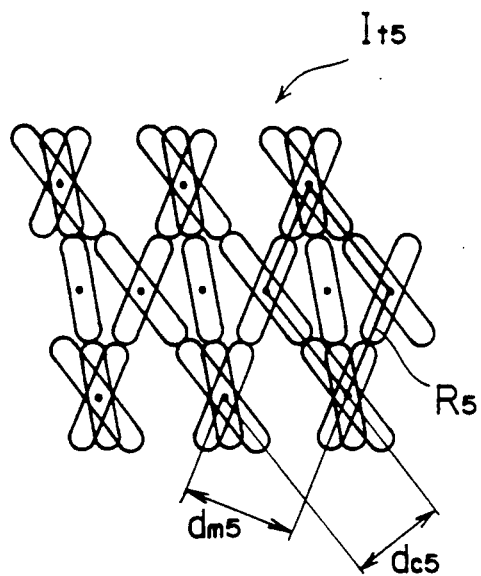
Figure 16C:
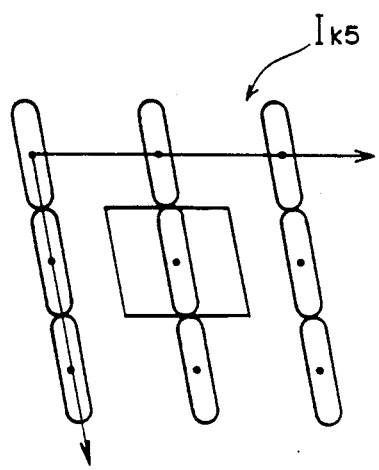

The positional relations among the three halftone images $I_{m4}$, $I_{c4}$ and $I_{k4}$ is not limited to those shown in FIGS. 15D and 15F, but those shown in FIGS. 15G and 15H can be employable. In reproduced images $I_{t4b}$ and $I_{t4c}$ shown in FIGS. 15G and 15H, respectively, the halftone centers $O_{m4}$, $O_{c4}$ and $O_{k4}$ are placed at respective positions different from each other. These positional relations have an effect on preventing the color shift when the halftone dots $H_{m4}$, $H_{c4}$ and $H_{k4}$ are so small that they are not connected with their respective neighboring halftone dots to form parallel lines; these positional relations decrease the areas where the small halftone dots overlap each other, whereby the color shift is hard to occur and the color tone of the reproduced image is stabilized.

Incidentally, the shape of the halftone dot $H_{k4}$ changes in the similar manner as that of the halftone dot $H_{c1}$ shown in the row (c) of FIG. 6A. However, since the first screen pitch $P1_{k4}$ of the halftone dot $H_{k4}$ is different from the second screen pitch $P2_{k4}$, a 100%-halftone-dot shape $U_{k4}$ shown in FIG. 15C is a rectangular.

As described before, the differences of the substantial screen rulings among the three halftone images are desirably less than about 20 percent in view of the stability of the color tone of the reproduced image. When the first and second halftone images $I_{m4}$ and $I_{c4}$ have a common screen angle and a common screen pitch, the differences of the substantial screen ruling can be made less than about 20 percent by satisfying the following relation:

$$P_a \geq P_b \geq 0.75 \times P_a \quad (17)$$

where
- $P_a$: a first screen pitch or a second screen pitch of the first and second halftone image, (In FIG. 15A, $P_a = P2_{m4}$), and
- $P_b$: a pitch of halftone dot centers measured in a perpendicular direction to the screen pitch $P_a$ (see FIG. 15A).

in FIGS. 15A and 15B, the following equation holds, which satisfies the equation (17):

$$P_b \approx 0.87 \times P_a \quad (18)$$

Further, in FIGS. 15A through 15C, the halftone images $I_{m4}$, $I_{c4}$ and $I_{k4}$ have a common pitch ($=P_a=P2_{k4}$) of halftone dot centers in the x-direction and a common pitch ($=P_b=P1_{k4}$) of the halftone dot centers in the y-direction. According to this configuration, a unit of a repetitional pattern appearing on a three-colored reproduced image has the size only twice the 100%-halftone-dot shape, whereby the rosette moire and the color shift is hard to occur.

The minimum parallelogram which is formed with parallel lines of the first and second halftone images is not necessarily a rhombus, as shown in FIG. 15D. FIGS. 16A through 16D illustrate halftone images $I_{m5}$, $I_{c5}$ and $I_{k5}$ and a reproduced image $I_{t5}$ whose minimum parallelogram $R_5$ is not a rhombus. The parallelogram $R_5$ is not a rhombus because an interval $d_{m5}$ of parallel lines of the first halftone image $I_{m5}$ is not equal to an interval $d_{c5}$ of parallel lines of the second halftone image $I_{c5}$. However, since the other features of the halftone images $I_{m5}$, $I_{c5}$ and $I_{k5}$ are the same as those of the halftone images shown in FIGS. 15A through 15D, these two sets of halftone images have a similar effect on preventing the rosette moire and the color shift.

As described before, the halftone images $I_{m4}$ and $I_{c4}$ shown in FIGS. 15A and 15B, respectively, have a common screen angle and a common screen pitch. However, the screen pitches of these halftone images can be changed. FIGS. 17A through 17D illustrate halftone images, a second halftone image out of which has a different screen pitch from that of FIG. 15B. FIGS. 17A through 17D correspond to FIGS. 15A through 15C and FIG. 15H, respectively. The halftone images $I_{m6}$ and $I_{k6}$ shown in FIGS. 17A and 17C are the same as the halftone images $I_{m4}$ and $I_{k4}$ shown in FIGS. 15A and 15C, respectively. A first screen pitch $P1_{c6}$ of the halftone image $I_{c6}$ shown in FIG. 17B is two thirds of the screen pitch $P1_{c4}$ of the halftone image $I_{c4}$ shown in FIG. 15B. The relations among the screen pitches of the three halftone images $I_{m6}$, $I_{c6}$ and $I_{k6}$ shown in FIGS. 17A through 17C are as follows:

$$P1_{m6} = 3/2 \cdot P1_{c6} \neq P1_{k4} \quad (19)$$

$$P2_{m6} = P2_{c6} \neq P2_{k6} \quad (20)$$

Since the direction of the first screen pitch $P1_{c6}$ of the second halftone image $I_{c6}$ is the direction in which the halftone dots $H_{c6}$ are connected with neighbors, that is, the extensional direction, the structure of the parallel lines of the halftone image $I_{c6}$ is the same as that of the halftone image $I_{c4}$ shown in FIG. 15B. Therefore, when the halftone dots are connected to each other to form parallel lines, the halftone images shown in FIGS. 17A through 17C are identical to those shown in FIGS. 15A through 15C. However, when the halftone-dot area rates of the halftone images are so small that the halftone dots are not connected with each other, the halftone images having the structure of FIGS. 17A through 17C are preferable to those of FIGS. 15A through 15C in view of the prevention of the color shift. This is because the ratios of the sizes of a blank area, a one-colored area, a two-colored area, a three-colored area are maintained at proper values at comparatively low range of the halftone-dot area rate when the halftone-dot centers $O_{m6}$, $O_{c6}$ and $O_{k6}$ are placed at respective positions different from each other as shown in FIG. 17D. That is, the registering mismatch causes smaller changes of the sizes of the blank area, the one-colored area, the two-colored area and the three-colored area in the reproduced image $I_{t6}$ shown in FIG. 17D than in the image shown in FIG. 15H, whereby the color shift is prevented. Incidentally, the ratio of the first screen pitches $P1_{m6}$ and $P1_{c6}$ is not limited to 3:2, as described above, but it can be any ratio expressed with integers.

The apparatus for recording the halftone images according to the second preferred embodiment of the present invention and the procedure therefore are omitted because they are the same as those employed in the first preferred embodiment.

Figure 18A:
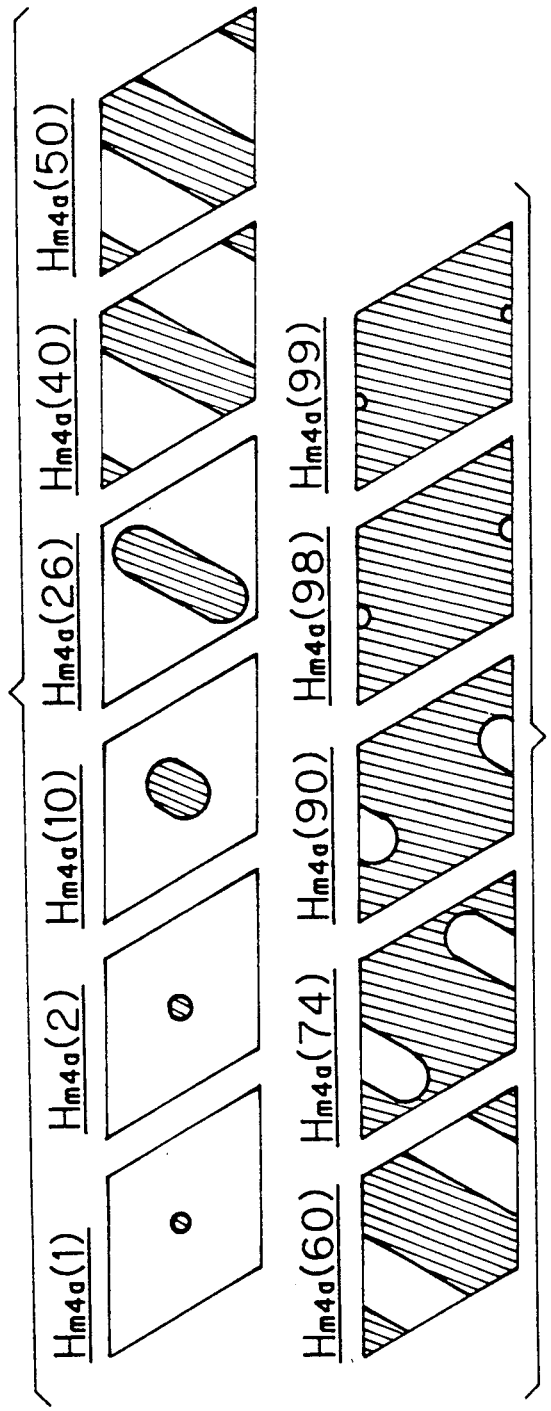

The modification of the shapes of the halftone dots can be made in the second preferred embodiment in the same manner as shown in FIG. 12. FIGS. 18A through 18C illustrate the modified shapes of halftone dots which correspond to those shown in FIG. 12. FIG. 18A shows the shapes of modified halftone dot $H_{m4a}(r)$, where r is varied from one to 99 percent, which is modified on the basis of the halftone dot $H_{m4}$ shown in FIG. 15A. Similarly, FIG. 18B shows the shapes of modified halftone dot $H_{c4a}(\underline{r})$ and the FIG. 18C shows the shapes of modified halftone dot $H_{k4a}(\underline{r})$.

In the halftone dots $H_{m4a}$, $H_{c4a}$ and $H_{k4a}$, the halftone elements (or areas-to-be-exposed) have isolated shapes at the halftone-dot area rate of at most about 25 percent. In addition, the blank elements (or areas-not-to-be-exposed) have isolated shapes at the halftone-dot area rate of at least about 75 percent. At the range from about 26 percent to about 74 percent of the halftone-dot area rate, the halftone images form respective parallel lines.

By modifying the shapes of the halftone dot as shown in FIGS. 18A through 18C, the tone jump is prevented and the tone reproducibility is improved in the same manner as the case of FIG. 12.

Although the halftone images are produced for the four colors Y, M, C and K in the above embodiments, various combinations of the colors can be employable. For example, two halftone images for a black printer and a brown printer may be produced for the double tone process in which the printed matter is printed with black ink and brown ink.

The halftone images are not necessarily recorded on a photosensitive film, but can be recorded on other recording medium. When an apparatus for reading an original and directly fabricating the printing plates for respective colors (or a so-called direct-plate-making apparatus) is employed, for example, the printing plates themselves are the recording media.

The shape of the halftone dots is not limited to a linear one as shown in FIGS. 1A through 1H and FIGS. 2A through 2F, but a thin ellipse and a shape called chain dot can be also employable. However, even when these shapes are employed, the length of a halftone dot measured in a prescribed extensional direction is desirably longer than any length of the halftone dot measured in any other direction.

Although the halftone signal conversion circuit 9 comprises the SPM unit 93 and the scanning coordinate computation circuit 91 shown in FIG. 4B, it may have another structure. For example, when one of two halftone dots $H_{y1}(\underline{r})$ and $H_{k1}(\underline{r})$ are obtained by rotating the other at 90 degrees, as shown in FIG. 6A, the screen pattern data for only one of the two halftone dots may be stored and the screen pattern data for the other halftone dot can be obtained by exchanging values $\underline{i}$ and $\underline{j}$ of the address (i, j).

The halftone image described above can be produced by setting the shape of the halftone dot with halftone-dot fonts depending on density (or gradation) and by changing a density signal of an image into a corresponding halftone font.

According to the present invention, a unit area of a repetitional pattern in a reproduced image has the size of the same order as a 100%-halftone-dot shape when a common screen pitch and a common screen angle are employed for halftone images closely related to the rosette moire, whereby the rosette moire can be prevented. In addition, since the halftone dots of respective halftone images have linear shapes extending respective extensional directions different from each other, the size of the areas where the halftone dots overlap each other does not change so much due to the registering mismatch that the color shift can be prevented according to the present invention. When first, second and third halftone images have a common screen lattice of a parallelogram shape, and when the extensional directions in the first and second halftone images are made agree with the two directions of two adjacent sides of the parallelogram, and when the extensional direction in the third halftone image is made agree with one of the two diagonals of the parallelogram, the color shift can be more efficiently prevented.

According to an aspect of the present invention, parallel lines of first and second halftone images form a minimum parallelogram whose two diagonals are used as the basis for setting the extensional direction in a third halftone image and a pitch of parallel lines of the third halftone image; this feature can prevent the rosette moire and the color shift. This feature further makes the substantial screen rulings of the respective halftone images close to each other, thereby improving the reproducibility of the color tone of printed matter.

When the halftone-dot elements are formed separately and insularly at the halftone-dot area rate of at most about 25 percent and the blank elements are similarly formed at the halftone-dot area rate of at least about 75 percent, these elements are not formed in thin linear shape, whereby the dot gain characteristics of the halftone images can be stabilized and the reproducibility of the color tone of printed matter can be improved.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of recording halftone images to be employed in reproducing a color image, comprising the steps of:
   (a) preparing at least two sets of image data representing color separation images of said color image, respectively, and
   (b) producing at least two halftone images as a function of said at least two sets of image data, respectively, by
      (i) setting a common screen pitch and a common screen angle to said at least two halftone images, and
      (ii) forming halftone dot elements in each of said at least two halftone images in a linear shape extending in a prescribed extensional direction different from extensional directions in the rest of said at least two halftone images.

2. A method in accordance with claim 1, wherein
   said halftone dot elements have isolated shapes in each of said at least two halftone images at the halftone-dot area rate of at most about 25 percent, and
   blank areas where said halftone dot elements do not exist have isolated shapes in each of said at least two halftone images at the halftone-dot area rate of at least about 75 percent.

3. A method in accordance with claim 1, wherein said at least two halftone images include first to third halftone images, halftone dot centers of each of said first to third halftone images form a lattice in the shape of a parallelogram, two extensional directions of halftone dot elements in said respective first and second halftone images agree with directions of two adjacent sides of said parallelogram, respectively, and an extensional direction of halftone dot elements in said third halftone images agrees with a direction of one of two diagonals of said parallelogram.

4. A method in accordance with claim 3, wherein said halftone dot centers of each of said first to third halftone images are placed, on an image plane of a reproduced image to be produced with said first to third halftone images, at same positions as said halftone dot centers of the rest of said first to third halftone images.

5. A method of recording halftone images to be employed in reproducing a color image, comprising the steps of:

(a) preparing at least two sets of image data representing color separation images of said color image, respectively, and (b) producing at least two halftone images as a function of said at least two sets of image data, respectively, by (i) setting a common screen pitch and a common screen angle to said at least two halftone images, and (ii) forming halftone dot elements in each of said at least two halftone images in a linear shape extending in a prescribed extensional direction different from extensional directions in the rest of said at least two halftone images wherein said at least two halftone images include first to third halftone images, halftone dot centers of each of said first to third halftone images form a lattice in the shape of a parallelogram, two extensional directions of halftone dot elements in said respective first and second halftone images agree with directions of two adjacent sides of said parallelogram, respectively, and an extensional direction of halftone dot elements in said third halftone images agrees with a direction of one of two diagonals of said parallelogram, and said halftone dot centers of each of said first to third halftone images are placed, on an image plane of a halftone images, at different positions from positions at which said halftone dot centers of the rest of said first to third halftone images are placed.

6. A method in accordance with claim 3, wherein said halftone dot elements have isolated shapes in each of said first to third halftone images at the halftone-dot area rate of at most about 25 percent, and blank areas where said halftone dot elements do not exist have isolated shapes in each of said first to third halftone images at the halftone-dot area rate of at least about 75 percent.

7. A method in accordance with claim 6, wherein said first to third halftone images are halftone images for magenta ink, cyan ink and black ink in arbitrary order.

8. A method of recording halftone images to be employed in reproducing a color image, comprising the steps of:

(a) preparing at least three sets of image data representing color separation images of said color image, respectively, and (b) producing at least first to third halftone images as a function of said at least three sets of image data, respectively, by (i) forming halftone dot elements in each of said first to third halftone images in a linear shape extending in a prescribed extensional direction different from extensional directions in the rest of said first to third halftone images, (ii) connecting said halftone dot images with each other in said prescribed extensional direction at a prescribed range of halftone-dot area rate in each of said first to third halftone images, thereby forming parallel lines with a regular interval in each of said first to third halftone images, (iii) setting said prescribed extensional direction in said third halftone image to agree with a direction of a longer diagonal out of two diagonals of a minimum parallelogram which is formed of said parallel lines in said fist and second halftone images, and (iv) setting a pitch of said parallel lines in said third halftone image measured in a direction of a shorter diagonal out of said two diagonals of said minimum parallelogram to be equal to a length of said shorter diagonal.

9. A method in accordance with claim 8, wherein said halftone dot elements have isolated shapes in each of said first to third halftone images at the halftone-dot area rate of at most about 25 percent, and blank areas where said halftone dot elements do not exist have isolated shapes in each of said first to third halftone images at the halftone-dot area rate of at least about 75 percent.

10. A method in accordance with claim 9, wherein differences between intervals of said parallel lines in said first to third halftone images are at most about 20 percent.

11. A method in accordance with claim 10, wherein said first to third halftone images are halftone images for magenta ink, cyan ink and black ink in arbitrary order.

12. An apparatus for recording halftone images to be employed in reproducing a color image as a function of at least two sets of image data representing color separation images of said color image, said apparatus comprising:

(a) means for storing and outputting at least two sets of prescribed halftone pattern data indicative of a threshold value of image data at each pixel for said at least two sets of image data, respectively, wherein said at least two sets of prescribed halftone pattern data are indicative of a common screen pitch and a common screen angle, and each of said at least two sets of prescribed halftone pattern data is indicative of halftone dot elements of a linear shape extending in a prescribed extensional direction different from extensional directions represented by the rest of said at least two sets of prescribed halftone pattern data, and (b) means for comparing said at least two sets of prescribed halftone pattern data with said at least two sets of image data with respect to each pixel, respectively, and recording at least two halftone images according to said comparing.

13. An apparatus in accordance with claim 12, wherein said at least two sets of prescribed halftone pattern data include first to third halftone pattern data, halftone dot centers represented by each of said first to third halftone pattern data form a lattice in the shape of a parallelogram, two extensional directions of halftone dot elements represented by said respective first and second halftone pattern data agree with directions of two adjacent sides of said parallelogram, respectively, and an extensional direction of halftone dot elements represented by said third halftone pattern data agrees with a direction of one of two diagonals of said parallelogram.

14. An apparatus in accordance with claim 13, wherein each of said first to third halftone pattern data is indicative of said halftone dot elements to have isolated shapes at the halftone-dot area rate of at most about 25 percent, and blank areas to have isolated shapes where said halftone dot elements do not exist at the halftone-dot area rate of at lest about 75 percent.

15. An apparatus for recording halftone images to be employed in reproducing a color image as a function of at least three sets of image data representing color separation images of said color image, said apparatus comprising:

(a) means for storing and outputting at least first to third halftone pattern data indicative of a prescribed threshold value of image data at each pixel for said at least three sets of image data, respectively, wherein each of said at least first to third halftone pattern data is indicative of halftone dot elements which have a linear shape extending in a prescribed extensional direction different from extensional directions represented by the rest of said at least first to third halftone pattern data, and which connect with each other in said prescribed extensional direction at a prescribed range of halftone-dot area rate, thereby forming parallel lines with a regular interval, said prescribed extensional direction represented by said third halftone pattern data agrees with a direction of a longer diagonal out of two diagonals of a minimum parallelogram which is formed of said parallel lines represented by said first and second halftone pattern data, and a pitch of said parallel lines represented by said third halftone pattern data measured in a direction of a shorter diagonal out of said two diagonal of said minimum parallelogram is equal to a length of said shorter diagonal, and (b) means for comparing said at least first to third halftone pattern data with said at least three sets of image data with respect to each pixel, respectively, and recording at least three halftone images according to said comparing.

16. An apparatus in accordance with claim 15, wherein each of said first to third halftone pattern data is indicative of said halftone dot elements to have isolated shapes in each of said first to third halftone images at the halftone-dot area rate of at most about 25 percent, and blank areas to have isolated shapes where said halftone dot elements do not exist at the halftone-dot area rate of at least 75 percent.

17. An apparatus in accordance with claim 16, wherein differences between intervals of said parallel lines represented by said first to third halftone pattern data are at most about 20 percent.

18. An apparatus for recording halftone images to be employed in reproducing a color image as a function of at least two sets of image data representing color separation images of said color image, said apparatus comprising:

(a) means for storing and outputting at least two sets of prescribed font data indicative of a shape of a halftone dot depending on a level of a given image data at each pixel for said at least two sets of image data, respectively, wherein said at least two sets of prescribed font data are indicative of a common screen pitch and a common screen angle, and each of said at least two sets of prescribed font data is indicative of halftone dot elements of a linear shape extending in a prescribed extensional direction different form extensional directions represented by the rest of said at least two sets of prescribed font data, and (b) means for recording at least two halftone images corresponding to said at least two sets of image data as a function of font data supplied from said means (a).

19. An apparatus in accordance with claim 18, wherein said at least two sets of prescribed font data include first to third font data, halftone dot centers represented by each of first to third font data form a lattice in the shape of a parallelogram, two extensional directions of halftone dot elements represented by said respective first and second font data agree with directions of two adjacent sides of said parallelogram, respectively, and an extensional direction of halftone dot elements represented by said third font data agrees with a direction of one of two diagonals of said parallelogram.

20. An apparatus in accordance with claim 19, wherein each of said first to third font data is indicative of said halftone dot elements to have isolated shapes at the halftone-dot area rate of at most about 25 percent, and blank areas to have isolated shapes where said halftone dot elements do not exist at the halftone-dot area rate of at least about 75 percent.

21. An apparatus for recording halftone images to be employed in reproducing a color image as a function of at least three sets of image data representing color separation images of said color image, said apparatus comprising:

(a) means for storing and outputting at least first to third font data indicative of a prescribed shape of a halftone dot depending on a level of given image data at each pixel for said at least three sets of image data, respectively, wherein each of said at least first to third font data is indicative of halftone dot elements which have a linear shape extending in a prescribed extensional direction different from extensional directions represented by the rest of said at least first to third font data, and which connect with each other in said prescribed extensional direction at a prescribed range of halftone-dot area rate, thereby forming parallel lines with a regular interval, said prescribed extensional direction represented by said third font data agrees with a direction of a longer diagonal out of two diagonals of a minimum parallelogram which is formed of said parallel lines represented by said first and second font data, and a pitch of said parallel lines represented by said third font data measured in a direction of a shorter diagonal out of said two diagonals of said minimum parallelogram is equal to a length of said shorter diagonal, and (b) means for recording at least three halftone images corresponding to said at least three sets of image data as a function of font data supplied from said means (a).

22. An apparatus in accordance with claim 21, wherein
each of said first to third font data is indicative of said halftone dot elements to have isolated shapes at the halftone-dot area rate of at most about 25 percent, and blank areas to have isolated shapes where said halftone dot elements do not exist at the halftone-dot area rate of at least about 75 percent.

23. An apparatus in accordance with claim 22, wherein
differences between intervals of said parallel lines represented by said first to third font data are at most about 20 percent.

24. Halftone images to be employed in reproducing a color image, comprising:

(a) a first halftone image of a first color having a prescribed screen angle and a prescribed screen pitch, halftone dot elements in said first halftone image being formed in a linear shape extending in a first extensional direction, and (b) a second halftone image of a second color having said prescribed screen angle and said prescribed screen pitch, halftone dot elements in said second halftone image being formed in a linear shape extending in a second extensional direction different from said first extensional direction.

25. Halftone images in accordance with claim 24, wherein
said halftone dot elements have isolated shapes in each of said first and second halftone images at the halftone-dot area rate of at most about 25 percent, and
blank areas where said halftone dot elements do not exist have isolated shapes in each of said first and second halftone images at the halftone-dot area rate of at least about 75 percent.

26. Halftone images in accordance with claim 24, wherein
said halftone images further comprises a third halftone image of a third color having said prescribed screen angle and said prescribed screen pitch, halftone dot elements in said third halftone image being formed in a linear shape extending in a third extensional direction different from said first and second extensional directions,
halftone dot centers of each of said first to third halftone images form a lattice in the shape of a parallelogram,
said first and second extensional directions agree with directions of two adjacent sides of said parallelogram, respectively, and
said third extensional direction agrees with a direction of one of two diagonals of said parallelogram.

27. Halftone images in accordance with claim 26, wherein
said halftone dot centers of each of said first to third halftone images are placed, on an image plane of a reproduced image to be produced with said first to third halftone images, at same positions as said halftone dot centers of the rest of said first to third halftone images.

28. Halftone images to be employed in reproducing a color image, comprising:

(a) a first halftone image of a first color having a prescribed screen angle and a prescribed screen pitch, halftone dot elements in said first halftone image being formed in a linear shape extending in a first extensional direction, and (b) a second halftone image of a second color having said prescribed screen angle and said prescribed screen pitch, halftone dot elements in said second halftone image being formed in a linear shape extending in a second extensional direction different from said first extensional direction, (c) a third halftone image of a third color having said prescribed screen angle and said prescribed screen pitch, halftone dot elements in said third halftone image being formed in a linear shape extending in a third extensional direction different from said first and second extensional directions, wherein
halftone dot centers of each of said first to third halftone images form a lattice in the shape of a parallelogram, and said first and second extensional directions agree with directions of two adjacent sides of said parallelogram, respectively, and said third extensional direction agrees with a direction of one of two diagonals of said parallelogram, and
said halftone dot centers of each of said first to third halftone images are placed, on an image plane of a reproduced image to be produced with said first to third halftone images, at different positions from positions at which said halftone dot centers of the rest of said first to third halftone images are placed.

29. Halftone images in accordance with claim 26, wherein
said halftone dot elements have isolated shapes in each of said first to third halftone images at the halftone-dot area rate of at most about 25 percent, and
blank areas where said halftone dot elements do not exist have isolated shapes in each of said first to third halftone images at the halftone-dot area rate of at least about 75 percent.

30. Halftone images in accordance with claim 29, wherein
said first to third halftone images are halftone images for magenta ink, cyan ink and black ink in arbitrary order.

31. Halftone images to be employed in reproducing a color image, comprising:

(a) a first halftone image of a first color, halftone dot elements in said first halftone image being formed in a linear shape extending in a first extensional direction to thereby form parallel lines with a first interval, (b) a second halftone image of a second color, halftone dot elements in said second halftone image being formed in a linear shape extending in a second extensional direction different from said first extensional direction to thereby form parallel lines with a second interval, and (c) a third halftone image of a third color, halftone dot elements in said third halftone image being formed in a linear shape extending in a third extensional direction different from said first and second extensional directions to thereby form parallel lines with a third interval, said third extensional direction agreeing with a direction of a longer diagonal out of two diagonals of a minimum parallelogram which is formed of said parallel lines in said first and second halftone images, a pitch of said parallel lines in said third halftone image which is measured in a direction of a shorter diagonal out of said two diagonals of said minimum parallelogram being equal to a length of said shorter diagonal.

32. Halftone images in accordance with claim 31, wherein
said halftone dot elements have isolated shapes in each of said first to third halftone images at the halftone-dot area rate of at most about 25 percent, and
blank areas where said halftone dot elements do not exist have isolated shapes in each of said first to third halftone images at the halftone-dot area rate of at least about 75 percent.

33. Halftone images in accordance with claim 32, wherein
differences between said first to third intervals are at most about 20 percent.

34. Halftone images in accordance with claim 33, wherein
said first to third halftone images are halftone images for magenta ink, cyan ink and black ink in arbitrary order.

35. A printed color image reproduced by overprinting at least two halftone images, comprising:
(a) a first halftone image of a first color having a prescribed screen angle and a prescribed screen pitch, halftone dot elements in said first halftone image being formed in a linear shape extending in a first extensional direction, and
(b) a second halftone image of a second color having a prescribed screen angle and a prescribed screen pitch, halftone dot elements in said second halftone image being formed in a linear shape extending in a second extensional direction different from said first extensional direction.

36. A printed color image in accordance with claim 35, wherein
said halftone dot elements have isolated shapes in each of said first and second halftone images at the halftone-dot area rate of at most about 25 percent, and
blank areas where said halftone dot elements do not exist have isolated shapes in each of said first and second halftone images at least about 75 percent.

37. A printed color image in accordance with claim 35, wherein
said at least two halftone images further comprise a third halftone image of a third color having said prescribed screen angle and said prescribed screen pitch, halftone dot elements in said third halftone image being formed in a linear shape extending in a third extensional direction different from said first and second extensional directions,
halftone dot centers of each of said first to third halftone images form a lattice in the shape of a parallelogram,
said first and second extensional directions agree with directions of two adjacent sides of said parallelogram, respectively, and
said third extensional direction agrees with a direction of one of two diagonals of said parallelogram.

38. A printed color image in accordance with claim 37, wherein
said halftone dot centers of each of said first to third halftone images are placed at same positions as said halftone dot centers of the rest of said first to third halftone images.

39. A printed color image reproduced by overprinting at least two halftone images, comprising:
(a) a first halftone image of a first color having a prescribed screen angle and a prescribed screen pitch, halftone dot elements in said first halftone image being formed in a linear shape extending in a first extensional direction, and
(b) a second halftone image of a second color having a prescribed screen angle and a prescribed screen pitch, halftone dot elements in said second halftone image being formed in a linear shape extending in a second extensional direction different from said first extensional direction,
(c) a third halftone image of a third color having said prescribed screen angle and said prescribed screen pitch, halftone dot elements in said third halftone image being formed in a linear shape extending in a third extensional direction different from said first and second extensional directions, wherein
halftone dot centers of each of said first to third halftone images form a lattice in the shape of a parallelogram, said first and second extensional directions agree with directions of two adjacent sides of said parallelogram, respectively,
said third extensional direction agrees with a direction of one of two diagonals of said parallelogram, and
said halftone dot centers of each of said first to third halftone images are placed at different positions from positions at which said halftone dot centers of the rest of said first to third halftone images are placed.

40. A printed color image in accordance with claim 37, wherein
said halftone dot elements have isolates shapes in each of said first to third halftone images at the halftone-dot area rate of at most about 25 percent, and
blank areas where said halftone dot elements do not exist have isolated shapes in each of said first to third halftone images at the halftone-dot area rate of at least about 75 percent.

41. A printed color image in accordance with claim 40, wherein
said first to third halftone images are halftone images for magenta ink, cyan ink and black ink in arbitrary order.

42. A printed color image reproduced by overprinting at least three halftone images, comprising:
(a) a first halftone image of a first color, halftone dot elements in said first halftone image being formed in a linear shape extending in a first extensional direction to thereby form parallel lines with a first interval,
(b) a second halftone image of a second color, halftone dot elements in said second halftone image being formed in a linear shape extending in a second extensional direction different from said first extensional direction to thereby form parallel lines with a second interval, and
(c) a third halftone image of a third color, halftone dot elements in said third halftone image being formed in a linear shape extending in a third extensional direction different from said first and second extensional directions to thereby form parallel lines with a third interval, said third extensional direction agreeing with a direction of a longer diagonal out of two diagonals of a minimum parallelogram which is formed of said parallel lines in said first and second halftone images, a pitch of said parallel lines in said third halftone image which is measured in a direction of a shorter diagonal out of said two diagonals of said minium parallelogram being equal to a length of said shorter diagonal.

43. A printed color image in accordance with claim 42, wherein
   said halftone dot elements have isolated shapes in each of said first to third halftone images at the halftone-dot area rate of at most about 25 percent, and
   blank areas where said halftone dot elements do not exist have isolated shapes in each of said first to third halftone images at the halftone-dot area rate of at least about 75 percent.

44. A printed color image in accordance with claim 43, wherein
   differences between said first to third intervals are at most about 20 percent.

45. A printed color image in accordance with claim 44, wherein
   said first to third halftone images are halftone images for magenta ink, cyan ink and black ink in arbitrary order.

46. A method of recording a halftone color image on a recording medium, comprising the steps of:
   (a) obtaining a plurality of color component image data representing a plurality of color components of a color image, respectively; and
   (b) obtaining a plurality of color component halftone dot images as a function of said plurality of color component image data, respectively, and reproducing said plurality of color component halftone dot images on a common region of a recording medium;
   wherein each of said plurality of color component halftone dot images is comprised of a plurality of dots arranged in a two-dimensional array;
   respective arrays of dots in said plurality of color component halftone dot images have a common array angle and a common array pitch; and
   said dots in said respective arrays have linear shapes extending in directions which are different for each color component halftone dot image.

* * * * *